US010541936B1

United States Patent
Florissi

(10) Patent No.: US 10,541,936 B1
(45) Date of Patent: Jan. 21, 2020

(54) METHOD AND SYSTEM FOR DISTRIBUTED ANALYSIS

(71) Applicant: EMC IP Holding Company LLC, Hopkinton, MA (US)

(72) Inventor: Patricia Gomes Soares Florissi, Briarcliff Manor, NY (US)

(73) Assignee: EMC IP Holding Company LLC, Hopkinton, MA (US)

( * ) Notice: Subject to any disclaimer, the term of this patent is extended or adjusted under 35 U.S.C. 154(b) by 136 days.

(21) Appl. No.: 15/799,314

(22) Filed: Oct. 31, 2017

Related U.S. Application Data

(63) Continuation-in-part of application No. 14/982,341, filed on Dec. 29, 2015, now Pat. No. 10,015,106, and a continuation-in-part of application No. 14/982,351, filed on Dec. 29, 2015, now Pat. No. 10,270,707.

(60) Provisional application No. 62/436,709, filed on Dec. 20, 2016, provisional application No. 62/143,685, filed on Apr. 6, 2015, provisional application No. 62/143,404, filed on Apr. 6, 2015.

(51) Int. Cl.
*H04L 12/911* (2013.01)
*H04L 29/08* (2006.01)
*G06F 17/18* (2006.01)

(52) U.S. Cl.
CPC .............. *H04L 47/70* (2013.01); *G06F 17/18* (2013.01); *H04L 67/10* (2013.01); *H04L 67/28* (2013.01)

(58) Field of Classification Search
CPC ......... G06F 17/30424; H04L 29/08135; H04L 67/10
See application file for complete search history.

(56) References Cited

U.S. PATENT DOCUMENTS

| | | |
|---|---|---|
| 6,112,225 A | 8/2000 | Kraft et al. |
| 6,516,350 B1 | 2/2003 | Lumelsky et al. |
| 7,010,163 B1 | 3/2006 | Weiss |
| 7,499,915 B2 | 3/2009 | Chandrasekar et al. |
| 7,657,537 B1 | 2/2010 | Corbett |
| 7,934,018 B1 | 4/2011 | Lavallee et al. |
| 7,934,248 B1 | 4/2011 | Yehuda et al. |
| 7,953,843 B2 | 5/2011 | Cherkasova |
| 8,224,825 B2 | 7/2012 | Wang et al. |
| 8,392,564 B1 * | 3/2013 | Czajkowski ........ H04L 41/5051 709/226 |
| 8,499,331 B1 | 7/2013 | Yehuda et al. |

(Continued)

FOREIGN PATENT DOCUMENTS

CN    104731595 A  *  6/2015

OTHER PUBLICATIONS

V.K. Vavilapalli et al., "Apache Hadoop YARN: Yet Another Resource Negotiator," Proceedings of the 4th Annual Symposium on Cloud Computing (SOCC), Article No. 5, Oct. 2013, 16 pages.

(Continued)

*Primary Examiner* — Shean Tokuta
(74) *Attorney, Agent, or Firm* — Ryan, Mason & Lewis, LLP

(57) ABSTRACT

A computing device of a data zone includes a persistent storage and a processor. The persistent storage includes a data source. The processor obtains a global computation request, instantiates a global computation based on the global computation request, and instantiates an intermediate computation in a second data zone based on the instantiated global computation.

20 Claims, 12 Drawing Sheets

(56) References Cited

U.S. PATENT DOCUMENTS

| | | | |
|---|---|---|---|
| 8,706,798 B1 | 4/2014 | Suchter et al. | |
| 8,732,118 B1* | 5/2014 | Cole | G06F 16/254 |
| | | | 707/607 |
| 8,806,061 B1 | 8/2014 | Lobo et al. | |
| 8,873,836 B1* | 10/2014 | Dietrich | G06K 9/00973 |
| | | | 382/155 |
| 8,886,649 B2* | 11/2014 | Zhang | G06F 16/93 |
| | | | 707/737 |
| 8,904,506 B1 | 12/2014 | Canavor et al. | |
| 8,938,416 B1* | 1/2015 | Cole | G06F 16/283 |
| | | | 707/607 |
| 9,020,802 B1* | 4/2015 | Florissi | G06F 9/445 |
| | | | 703/24 |
| 9,031,992 B1 | 5/2015 | Florissi et al. | |
| 9,130,832 B1* | 9/2015 | Boe | G06F 16/24 |
| 9,158,843 B1* | 10/2015 | Florissi | H04L 67/1097 |
| 9,229,952 B1* | 1/2016 | Meacham | G06F 16/219 |
| 9,235,446 B2* | 1/2016 | Bruno | G06F 9/5066 |
| 9,239,711 B1 | 1/2016 | Mistry | |
| 9,280,381 B1 | 3/2016 | Florissi et al. | |
| 9,338,218 B1 | 5/2016 | Florissi et al. | |
| 9,361,263 B1 | 6/2016 | Florissi et al. | |
| 9,374,660 B1 | 6/2016 | Tilles | |
| 9,418,085 B1* | 8/2016 | Shih | G06F 16/211 |
| 9,451,012 B1* | 9/2016 | Neill | H04L 67/1012 |
| 9,489,233 B1* | 11/2016 | Florissi | G06F 9/5072 |
| 9,613,124 B2* | 4/2017 | Rabinowitz | H04L 43/00 |
| 9,659,057 B2* | 5/2017 | Tian | G06F 16/2471 |
| 9,665,660 B2 | 5/2017 | Wensel | |
| 9,678,497 B2* | 6/2017 | Karypis | G05B 19/0421 |
| 9,697,262 B2 | 7/2017 | Chandramouli et al. | |
| 9,747,127 B1 | 8/2017 | Florissi et al. | |
| 9,747,128 B1 | 8/2017 | Vijendra et al. | |
| 9,767,149 B2* | 9/2017 | Ozcan | G06F 16/2471 |
| 9,805,170 B2 | 10/2017 | Keyes et al. | |
| 9,832,068 B2* | 11/2017 | McSherry | H04L 29/08135 |
| 9,838,410 B2* | 12/2017 | Muddu | G06K 9/2063 |
| 9,848,041 B2* | 12/2017 | Einkauf | H04L 67/1076 |
| 9,996,662 B1 | 6/2018 | Florissi et al. | |
| 10,015,106 B1 | 7/2018 | Florissi et al. | |
| 10,111,492 B2 | 10/2018 | Florissi et al. | |
| 10,114,923 B1 | 10/2018 | Florissi et al. | |
| 10,122,806 B1 | 11/2018 | Florissi et al. | |
| 10,127,352 B1 | 11/2018 | Florissi et al. | |
| 10,148,736 B1 | 12/2018 | Lee et al. | |
| 10,250,708 B1 | 4/2019 | Carver et al. | |
| 10,270,707 B1 | 4/2019 | Florissi et al. | |
| 10,277,668 B1 | 4/2019 | Florissi | |
| 10,311,363 B1 | 6/2019 | Florissi et al. | |
| 10,331,380 B1 | 6/2019 | Florissi et al. | |
| 10,348,810 B1 | 7/2019 | Florissi et al. | |
| 10,374,968 B1 | 8/2019 | Duerk et al. | |
| 10,404,787 B1 | 9/2019 | Florissi et al. | |
| 10,425,350 B1 | 9/2019 | Florissi | |
| 2002/0056025 A1 | 5/2002 | Qiu et al. | |
| 2002/0073167 A1 | 6/2002 | Powell et al. | |
| 2002/0129123 A1 | 9/2002 | Johnson et al. | |
| 2003/0212741 A1* | 11/2003 | Glasco | G06F 12/0817 |
| | | | 709/203 |
| 2004/0247198 A1 | 12/2004 | Ghosh et al. | |
| 2005/0010712 A1 | 1/2005 | Kim et al. | |
| 2005/0102354 A1 | 5/2005 | Hollenbeck et al. | |
| 2005/0114476 A1 | 5/2005 | Chen et al. | |
| 2005/0132297 A1 | 6/2005 | Milic-Frayling et al. | |
| 2005/0153686 A1 | 7/2005 | Kall et al. | |
| 2005/0165925 A1 | 7/2005 | Dan et al. | |
| 2005/0266420 A1 | 12/2005 | Pusztai et al. | |
| 2005/0278761 A1 | 12/2005 | Gonder et al. | |
| 2006/0002383 A1 | 1/2006 | Jeong et al. | |
| 2006/0122927 A1 | 6/2006 | Huberman et al. | |
| 2006/0126865 A1 | 6/2006 | Blamey et al. | |
| 2006/0173628 A1 | 8/2006 | Sampas et al. | |
| 2007/0026426 A1 | 2/2007 | Fuernkranz et al. | |
| 2007/0076703 A1 | 4/2007 | Yoneda et al. | |
| 2007/0088703 A1 | 4/2007 | Kasiolas et al. | |
| 2008/0027954 A1 | 1/2008 | Gan et al. | |
| 2008/0028086 A1 | 1/2008 | Chetuparambil et al. | |
| 2008/0077607 A1 | 3/2008 | Gatawood et al. | |
| 2008/0155100 A1 | 6/2008 | Ahmed et al. | |
| 2008/0260119 A1 | 10/2008 | Marathe et al. | |
| 2008/0279167 A1* | 11/2008 | Cardei | H04W 28/26 |
| | | | 370/342 |
| 2009/0062623 A1 | 3/2009 | Cohen et al. | |
| 2009/0076651 A1 | 3/2009 | Rao | |
| 2009/0150084 A1 | 6/2009 | Colwell et al. | |
| 2009/0198389 A1 | 8/2009 | Kirchhof-Falter et al. | |
| 2009/0310485 A1 | 12/2009 | Averi et al. | |
| 2009/0319188 A1 | 12/2009 | Otto | |
| 2010/0005077 A1 | 1/2010 | Krishnamurthy et al. | |
| 2010/0042809 A1 | 2/2010 | Schenfeld et al. | |
| 2010/0076845 A1 | 3/2010 | Ramer et al. | |
| 2010/0076856 A1 | 3/2010 | Mullins | |
| 2010/0122065 A1 | 5/2010 | Dean et al. | |
| 2010/0131639 A1 | 5/2010 | Narayana et al. | |
| 2010/0184093 A1 | 7/2010 | Donovan et al. | |
| 2010/0229178 A1 | 9/2010 | Ito | |
| 2010/0250646 A1 | 9/2010 | Dunagan et al. | |
| 2010/0290468 A1 | 11/2010 | Lynam et al. | |
| 2010/0293334 A1 | 11/2010 | Xun et al. | |
| 2010/0299437 A1 | 11/2010 | Moore | |
| 2011/0020785 A1 | 1/2011 | Lowery, Jr. et al. | |
| 2011/0029999 A1 | 2/2011 | Foti | |
| 2011/0103364 A1 | 5/2011 | Li | |
| 2011/0145828 A1 | 6/2011 | Takahashi et al. | |
| 2011/0208703 A1 | 8/2011 | Fisher et al. | |
| 2011/0314002 A1 | 12/2011 | Oliver et al. | |
| 2012/0030599 A1 | 2/2012 | Butt et al. | |
| 2012/0059707 A1 | 3/2012 | Goenka et al. | |
| 2012/0071774 A1 | 3/2012 | Osorio et al. | |
| 2012/0191699 A1 | 7/2012 | George et al. | |
| 2013/0035956 A1 | 2/2013 | Carmeli et al. | |
| 2013/0044925 A1 | 2/2013 | Kozuka et al. | |
| 2013/0054670 A1* | 2/2013 | Keyes | G06F 19/3481 |
| | | | 709/201 |
| 2013/0194928 A1 | 8/2013 | Iqbal | |
| 2013/0246460 A1 | 9/2013 | Maltbie et al. | |
| 2013/0282897 A1* | 10/2013 | Siegel | H04L 43/0876 |
| | | | 709/224 |
| 2013/0290249 A1 | 10/2013 | Merriman et al. | |
| 2013/0291118 A1 | 10/2013 | Li et al. | |
| 2013/0318257 A1 | 11/2013 | Lee et al. | |
| 2013/0326538 A1* | 12/2013 | Gupta | G06F 9/50 |
| | | | 718/107 |
| 2013/0346229 A1 | 12/2013 | Martin et al. | |
| 2013/0346988 A1 | 12/2013 | Bruno et al. | |
| 2014/0012843 A1 | 1/2014 | Soon-Shiong | |
| 2014/0025393 A1 | 1/2014 | Wang et al. | |
| 2014/0032240 A1* | 1/2014 | Lougheed | G06Q 50/24 |
| | | | 705/3 |
| 2014/0075161 A1 | 3/2014 | Zhang et al. | |
| 2014/0081984 A1 | 3/2014 | Sitsky et al. | |
| 2014/0082178 A1 | 3/2014 | Boldyrev et al. | |
| 2014/0143251 A1* | 5/2014 | Wang | G06F 16/285 |
| | | | 707/737 |
| 2014/0173331 A1 | 6/2014 | Martin et al. | |
| 2014/0173618 A1* | 6/2014 | Neuman | G06F 9/5066 |
| | | | 718/104 |
| 2014/0214752 A1* | 7/2014 | Rash | G06F 16/254 |
| | | | 707/600 |
| 2014/0215007 A1* | 7/2014 | Rash | H04L 67/1002 |
| | | | 709/217 |
| 2014/0278808 A1 | 9/2014 | Iyoob et al. | |
| 2014/0279201 A1 | 9/2014 | Iyoob et al. | |
| 2014/0280298 A1 | 9/2014 | Petride et al. | |
| 2014/0280363 A1 | 9/2014 | Heng et al. | |
| 2014/0280604 A1 | 9/2014 | Ahiska et al. | |
| 2014/0280880 A1 | 9/2014 | Tellis et al. | |
| 2014/0280990 A1 | 9/2014 | Dove et al. | |
| 2014/0310258 A1* | 10/2014 | Tian | G06F 16/2471 |
| | | | 707/718 |
| 2014/0310718 A1 | 10/2014 | Gerphagnon et al. | |
| 2014/0320497 A1 | 10/2014 | Vojnovic et al. | |

(56) References Cited

U.S. PATENT DOCUMENTS

| | | |
|---|---|---|
| 2014/0324647 A1 | 10/2014 | Iyoob et al. |
| 2014/0325041 A1 | 10/2014 | Xu et al. |
| 2014/0333638 A1 | 11/2014 | Kaminski et al. |
| 2014/0358999 A1 | 12/2014 | Rabinowitz et al. |
| 2014/0365518 A1 | 12/2014 | Cal et al. |
| 2014/0365662 A1 | 12/2014 | Dave et al. |
| 2014/0372611 A1* | 12/2014 | Matsuda ............... H04L 45/12 709/225 |
| 2014/0379722 A1 | 12/2014 | Mysur et al. |
| 2015/0006619 A1* | 1/2015 | Banadaki ............... H04L 67/10 709/203 |
| 2015/0019710 A1 | 1/2015 | Shaashua et al. |
| 2015/0039586 A1 | 2/2015 | Kerschbaum et al. |
| 2015/0039667 A1* | 2/2015 | Shah ................ H04L 67/1044 709/201 |
| 2015/0058843 A1* | 2/2015 | Holler ..................... G06F 9/455 718/1 |
| 2015/0066646 A1* | 3/2015 | Sriharsha ........... G06Q 30/0256 705/14.54 |
| 2015/0081877 A1 | 3/2015 | Sethi et al. |
| 2015/0088786 A1 | 3/2015 | Anandhakrishnan |
| 2015/0092561 A1* | 4/2015 | Sigoure ................. H04L 49/50 370/236 |
| 2015/0120791 A1* | 4/2015 | Gummaraju ........ G06F 9/45558 707/823 |
| 2015/0121371 A1* | 4/2015 | Gummaraju ........ G06F 9/45533 718/1 |
| 2015/0169683 A1 | 6/2015 | Chandramouli et al. |
| 2015/0178052 A1 | 6/2015 | Gupta et al. |
| 2015/0193583 A1* | 7/2015 | McNair .................. G16H 50/20 705/2 |
| 2015/0201036 A1* | 7/2015 | Nishiki ............... H04L 67/1095 709/224 |
| 2015/0222723 A1 | 8/2015 | Adapalli et al. |
| 2015/0254344 A1* | 9/2015 | Kulkarni ............ G06F 16/7847 707/747 |
| 2015/0254558 A1* | 9/2015 | Arnold ................. G06F 16/245 700/19 |
| 2015/0262268 A1 | 9/2015 | Padmanabhan et al. |
| 2015/0264122 A1* | 9/2015 | Shau ........................ H04L 67/10 709/203 |
| 2015/0269230 A1* | 9/2015 | Kardes .................. G06Q 50/01 707/692 |
| 2015/0277791 A1* | 10/2015 | Li ........................... G06F 3/0689 711/114 |
| 2015/0278513 A1 | 10/2015 | Krasin et al. |
| 2015/0295781 A1 | 10/2015 | Maes |
| 2015/0302075 A1* | 10/2015 | Schechter ............. G06F 9/5066 707/641 |
| 2015/0339210 A1* | 11/2015 | Kopp .................... G06F 11/3495 718/100 |
| 2015/0355946 A1 | 12/2015 | Kang |
| 2015/0369618 A1 | 12/2015 | Barnard et al. |
| 2016/0004827 A1 | 1/2016 | Silva et al. |
| 2016/0063191 A1 | 3/2016 | Vesto et al. |
| 2016/0072726 A1 | 3/2016 | Soni et al. |
| 2016/0087909 A1 | 3/2016 | Chatterjee et al. |
| 2016/0098021 A1 | 4/2016 | Zornio et al. |
| 2016/0098472 A1* | 4/2016 | Appleton ............... G06F 16/27 707/737 |
| 2016/0098662 A1* | 4/2016 | Voss ................ G06Q 10/06316 705/7.26 |
| 2016/0112531 A1 | 4/2016 | Milton et al. |
| 2016/0125056 A1* | 5/2016 | Knezevic ............. G06F 16/258 707/722 |
| 2016/0132576 A1* | 5/2016 | Qi .......................... G06F 16/27 707/600 |
| 2016/0170882 A1 | 6/2016 | Choi et al. |
| 2016/0171072 A1 | 6/2016 | Jagtiani et al. |
| 2016/0179642 A1 | 6/2016 | Cai |
| 2016/0179979 A1 | 6/2016 | Aasman et al. |
| 2016/0182305 A1 | 6/2016 | Martin et al. |
| 2016/0182327 A1 | 6/2016 | Coleman, Jr. et al. |
| 2016/0188594 A1* | 6/2016 | Ranganathan .... G06F 16/24552 707/769 |
| 2016/0196324 A1* | 7/2016 | Haviv .................. G06F 16/122 707/626 |
| 2016/0205106 A1 | 7/2016 | Yacoub et al. |
| 2016/0241893 A1 | 8/2016 | Allhands et al. |
| 2016/0246981 A1 | 8/2016 | Nakagawa et al. |
| 2016/0260023 A1 | 9/2016 | Miserendino, Jr. et al. |
| 2016/0261727 A1* | 9/2016 | Yang ................... H04L 65/4084 |
| 2016/0267132 A1 | 9/2016 | Castellanos et al. |
| 2016/0269228 A1 | 9/2016 | Franke et al. |
| 2016/0283551 A1 | 9/2016 | Fokoue-Nkoutche et al. |
| 2016/0323377 A1* | 11/2016 | Einkauf .............. H04L 67/1076 |
| 2016/0328661 A1* | 11/2016 | Reese .................... G06F 16/29 |
| 2016/0337473 A1 | 11/2016 | Rao |
| 2016/0350157 A1* | 12/2016 | Necas .................... G06F 9/5038 |
| 2017/0006135 A1* | 1/2017 | Siebel .................... H04L 67/02 |
| 2017/0032263 A1 | 2/2017 | Yuan et al. |
| 2017/0083573 A1 | 3/2017 | Rogers et al. |
| 2017/0109299 A1* | 4/2017 | Belair ................. G06F 13/1668 |
| 2017/0116289 A1 | 4/2017 | Deshmukh et al. |
| 2017/0149630 A1* | 5/2017 | Feller .................. H04L 41/0893 |
| 2017/0155707 A1* | 6/2017 | Rash ................... H04L 67/1002 |
| 2017/0187785 A1 | 6/2017 | Johnson et al. |
| 2017/0220646 A1* | 8/2017 | Schechter ............ G06F 9/5066 |
| 2017/0272458 A1* | 9/2017 | Muddu ............... H04L 63/1416 |
| 2017/0323028 A1* | 11/2017 | Jonker ................ G06F 16/9024 |
| 2017/0337135 A1* | 11/2017 | Hu ...................... G06F 16/9024 |
| 2017/0346690 A1* | 11/2017 | Dorado ............... H04L 41/5045 |
| 2018/0054355 A1 | 2/2018 | Balser et al. |
| 2018/0101583 A1 | 4/2018 | Li et al. |
| 2018/0181957 A1 | 6/2018 | Crabtree et al. |
| 2018/0189296 A1 | 7/2018 | Ashour et al. |
| 2018/0240062 A1 | 8/2018 | Crabtree et al. |
| 2018/0308585 A1 | 10/2018 | Holmes et al. |
| 2019/0026146 A1 | 1/2019 | Peffers et al. |
| 2019/0130122 A1 | 5/2019 | Barnes et al. |
| 2019/0149418 A1 | 5/2019 | Bertsche et al. |
| 2019/0173666 A1 | 6/2019 | Ardashev et al. |
| 2019/0179672 A1 | 6/2019 | Christidis et al. |
| 2019/0206090 A1 | 7/2019 | Ray et al. |
| 2019/0207759 A1 | 7/2019 | Chan et al. |
| 2019/0214848 A1 | 7/2019 | Waffner |
| 2019/0244243 A1 | 8/2019 | Goldberg et al. |
| 2019/0253134 A1 | 8/2019 | Coleman et al. |

OTHER PUBLICATIONS

A.C. Murthy et al., "Apache Hadoop YARN: Moving beyond MapReduce and Batch Processing with Apache Hadoop 2," Addison-Wesley Professional, Mar. 29, 2014, 78 pages.

Global Alliance for Genomics and Health, "Beacons," https://genomicsandhealth.org/work-products-demonstration-projects/beacons, Jun. 27, 2014, 2 pages.

Data Working Group, "Global Alliance Genomics API," http://ga4gh.org/#documentation, Dec. 28, 2015, 2 pages.

Aaron Krol, "Beacon Project Cracks the Door for Genomic Data Sharing," http://www.bio-itworld.com/2015/8/14/beacon-project-cracks-door-genomic-data-sharing.html, Aug. 14, 2015, 3 pages.

U.S. Appl. No. 14/982,341 filed in the name of Patricia Gomes Soares Florissi et al., on Dec. 29, 2015 and entitled "Multi-Cluster Distributed Data Processing Platform."

U.S. Appl. No. 14/982,351 filed in the name of Patricia Gomes Soares Florissi et al., on Dec. 29, 2015 and entitled "Distributed Catalog Service for Multi-Cluster Data Processing Platform."

U.S. Appl. No. 15/395,340 filed in the name of Bryan Duerk et al., on Dec. 30, 2016 and entitled "Data-Driven Automation Mechanism for Analytics Workload Distribution."

Wikipedia, "Apache Spark," https://en.wikipedia.org/wiki/Apache_Spark, Apr. 10, 2017, 6 pages.

U.S. Appl. No. 15/485,843 filed in the name of Patricia Gomes Soares Florissi et al., on Apr. 12, 2017 and entitled "Scalable Distributed In-Memory Computation."

U.S. Appl. No. 15/582,743 filed in the name of Patricia Gomes Soares Florissi et al., on Apr. 30, 2017 and entitled "Scalable Distributed In-Memory Computation Utilizing Batch Mode Extensions."

(56) References Cited

OTHER PUBLICATIONS

M. K. Gardner et al., "Parellel Genomic Sequence-Searching on an Ad-Hoc Grid: Experiences, Lessons Learned, and Implications," Proceedings of the 2006 ACM/IEEE SC/06 Conference, IEEE Computer Society, 2006, 14 pages.

A.G. Craig et al., "Ordering of Cosmid Clones Covering the Herpes Simplex Virus Type I (HSV-I) Genome: A Test Case for Fingerprinting by Hybridisation," Nucleic Acids Research, vol. 18, 1990, pp. 2653-2660.

T.R. Golub et al., "Molecular classification of Cancer: Class Discovery and Class Prediction by Gene Expression Monitoring," Science, vol. 286, Oct. 15, 1999, pp. 531-537.

D. Singh et al., "Gene Expression Correlates of Clinical Prostate Cancer Behavior," Cancer Cell, vol. 1, Mar. 2002, pp. 203-209.

U.S. Appl. No. 15/281,248 filed in the name of Patricia Gomes Soares Florissi et al., on Sep. 30, 2016 and entitled "Methods and Apparatus Implementing Data Model for Disease Monitoring, Characterization and Investigation."

P.P. Jayaraman et al., "Analytics-as-a-Service in a Multi-Cloud Environment Through Semantically-Enabled Hierarchical Data Processing," Software: Practice and Experience, Aug. 2017, pp. 1139-1156, vol. 47, No. 8.

J.Y.L. Lee et al., "Sufficiency Revisited: Rethinking Statistical Algorithms in the Big Data Era," The American Statistician, Dec. 15, 2016, 22 pages.

S. Wang et al., "Genome Privacy: Challenges, Technical Approaches to Mitigate Risk, and Ethical Considerations in the United States," Annals of the New York Academy of Sciences, Jan. 2017, pp. 73-83, vol. 1387, No. 1.

K. Xu et al., "Privacy-Preserving Machine Learning Algorithms for Big Data Systems," IEEE 35th International Conference on Distributed Computing Systems (ICDCS), Jun. 29-Jul. 2, 2015, pp. 318-327.

X. Wu et al., "Privacy Preserving Data Mining Research: Current Status and Key Issues," Proceedings of the 7th International Conference on Computational Science, Part III: ICCS 2007, May 2007, pp. 762-772.

A.P. Kulkarni et al., "Survey on Hadoop and Introduction to YARN," International Journal of Emerging Technology and Advanced Engineering, May 2014, pp. 82-67, vol. 4, No. 5.

R.R. Miller et al., "Metagenomics for Pathogen Detection in Public Health," Genome Medicine, Sep. 20, 2013, 14 pages, vol. 5, No. 81.

T. Thomas et al., "Metagenomics—a Guide from Sampling to Data Analysis," Microbial Informatics and Experimentation, Oct. 13, 2012, 12 pages, vol. 2, No. 3.

E.R. Ganser et al., "A Technique for Drawing Directed Graphs," IEEE Transactions on Software Engineering, Mar. 1993, pp. 214-230, vol. 19, No. 3.

J. Leskovec, "Graphs Over Time: Densification Laws, Shrinking Diameters arid Possible Explanations," Proceedings of the Eleventh ACM SIGKDD International Conference on Knowledge Discovery in Data Mining, Aug. 21-24, 2005, pp. 177-187.

H. Zha et al., "Bipartite Graph Partitioning and Data Clustering," Proceedings of the Tenth International Conference on Information and Knowledge Management, Oct. 5-10, 2001, pp. 25-32.

A. Oghabian et al., "Biclustering Methods: Biological Relevance and Application in Gene Expression Analysis," PLOS One, Mar. 20, 2014, 10 pages, vol. 9, No. 3.

S. Ryza, "How To: Tune Your Apache Spark Jobs," https://blog.cloudera.com/blog/2015/03/how-to-tune-your-apache-spark-jobs-part-1/, Mar. 9, 2015, 23 pages.

T. White, "Hadoop: The Definitive Guide," O'Reilly Media, Inc., Fourth Edition, Sebastopol, CA, Apr. 2015, 756 pages.

L. Shashank, "Spark on Yarn," https://www.slideshare.net/datamantra/spark-on-yarn-54201193, Oct. 21, 2015, 47 pages.

Dell, "Dell Boomi Platform: Connect Every Part of Your Business to Transform How You do Business," https://marketing.boomi.com/rs/777-AVU-348/images/Boomi-Integration-Cloud.pdf, 2017, 4 pages.

D. Ucar et al., "Combinatorial Chromatin Modification Patterns in the Human Genome Revealed by Subspace Clustering," Nucleic Acids Research, May 1, 2011, pp. 4063-4075, vol. 39, No. 10.

\* cited by examiner

METHOD AND SYSTEM FOR DISTRIBUTED ANALYSIS

CROSS REFERENCE TO RELATED APPLICATIONS

The present application is a continuation-in-part of U.S. patent application Ser. No. 14/982,341, filed Dec. 29, 2015, now U.S. Pat. No. 10,015,106 and entitled "Multi-Cluster Distributed Data Processing Platform," and U.S. patent application Ser. No. 14/982,351, filed Dec. 29, 2015, now U.S. Pat. No. 10,270,707 and entitled "Distributed Catalog Service for Multi-Cluster Data Processing Platform," both of which are incorporated by reference herein in their entirety, and which claim priority to U.S. Provisional Patent Application Ser. No. 62/143,404, entitled "World Wide Hadoop Platform," and U.S. Provisional Patent Application Ser. No. 62/143,685, entitled "Bioinformatics," both filed Apr. 6, 2015, and incorporated by reference herein in their entirety.

This application also claims the benefit of U.S. Provisional Application Ser. No. 62/436,709, filed Dec. 20, 2016. In accordance with 37 CFR § 1.57(c), the content of provisional application No. 62/436,709 is expressly incorporated by reference.

BACKGROUND

Computing devices may generate new data based on stored data. For example, a computing device may store a database that includes sales data for a variety of products over a period of time. The computing device may generate new data by calculating an average sale price of each sale.

In some cases, a database or other type of data source may be distributed across a number of computing devices. For example, a first portion of a database that stores sales at a first store location may be stored on a local storage of a first computing device and a second portion of the database that stores sales at a second store location may be stored on a local storage of a second computing device. To generate new data, the second portion of the database may be sent to the first computing device and stored on the local storage of the first computing device. The first computing device may calculate the average sale price of each sale across the database using the first portion and second portion of the database stored on the local storage.

SUMMARY

In one aspect, a computing device of a data zone in accordance with one or more embodiments of the invention includes a persistent storage and a processor. The persistent storage includes a data source. The processor obtains a global computation request, instantiates a global computation based on the global computation request, and instantiates an intermediate computation in a second data zone based on the instantiated global computation.

In one aspect, a method of operating a computing device of a data zone in accordance with one or more embodiments of the invention includes obtaining, by the computing device, a global computation request; instantiating, by the computing device, a global computation based on the global computation request; and instantiating, by the computing device, an intermediate computation in a second data zone based on the instantiated global computation.

In one aspect, a non-transitory computer readable medium in accordance with one or more embodiments of the invention includes computer readable program code, which when executed by a computer processor enables the computer processor to perform a method for operating a computing device of a data zone, the method includes obtaining, by the computing device, a global computation request; instantiating, by the computing device, a global computation based on the global computation request; and instantiating, by the computing device, an intermediate computation in a second data zone based on the instantiated global computation.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
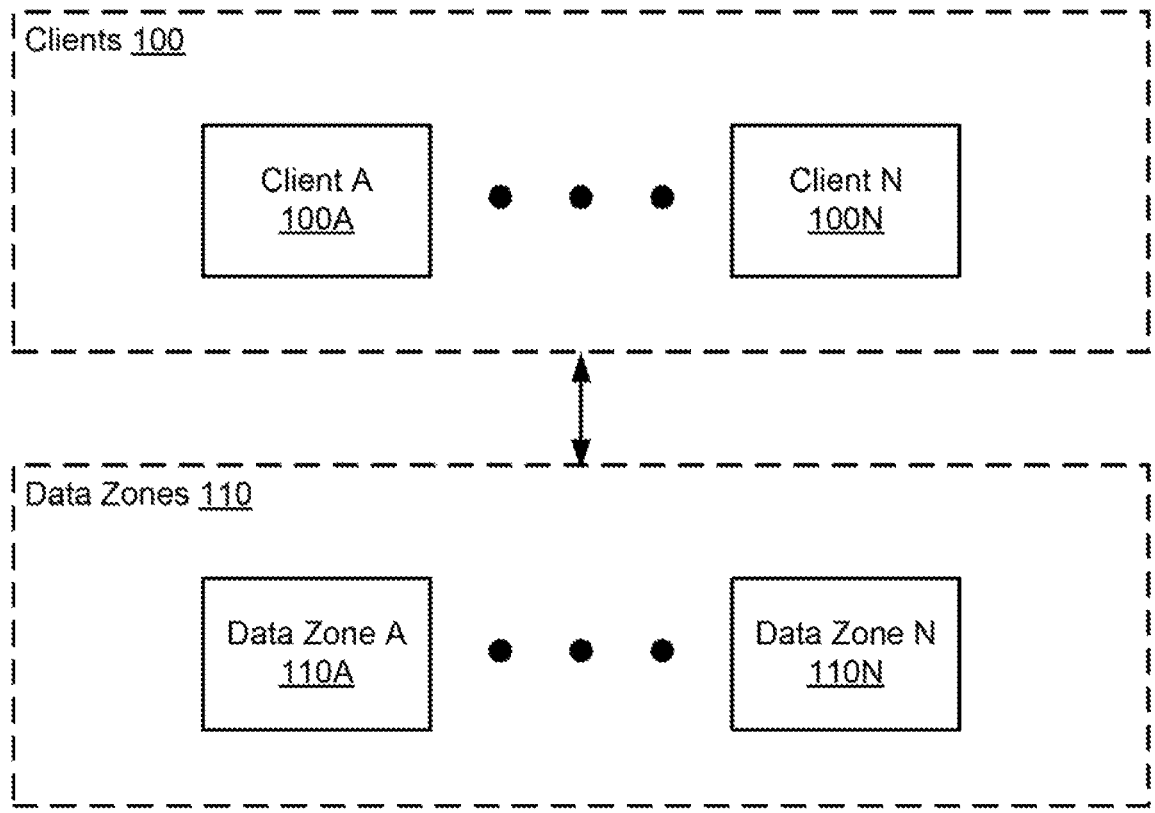
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for performing computations using distributed data sources. More specifically, the systems, devices, and methods may enable computations to be performed across data sources residing in any number of data zones. In one or more embodiments of the invention, a global computation may be broken down into any number of intermediate computations for execution in any number of data zones. As used herein, an intermediate computation is any computation generated to service a global computation.

In one or more embodiments of the invention, an intermediate computation may generate a computation result based on only local data of a data zone in which the intermediate computation is being performed. In one or more embodiments of the invention, an intermediate computation may generate a result based on local data of a data zone in which the intermediate computation is being performed and local data of a second data zone. To obtain the local data, or a result based on the local data in the second data zone, the intermediate computation may instantiate a second global computation in the second data zone. Thus, instantiation of a global computation may result in the recursive instantiation of any number of computations in any number of data zones.

In one or more embodiments of the invention, instantiated intermediate computations may generate computation results that are used by other computations to generate a second computation result. For example, the results of the intermediate computations may be aggregated in a single data zone and a global computation result may be generated using the aggregated intermediate computations.

In one or more embodiments of the invention, an intermediate computation instantiated to service a global computation may be a second global computation. For example, a first global computation may use, as input, the result of a global computation as an intermediate computation. To service the first global computation, the second global computation may be instantiated as an intermediate computation of the global computation.

As used herein, a data zone is any collection of computing devices that are logically demarcated from all other computing devices. For example, a data zone may be a cloud computing environment. The cloud computing environment may utilize the computing resources of a number of computing devices.

As used herein, a data source refers to any data of any type stored in any format on a computing device and/or a storage device of a data zone.

In one or more embodiments of the invention, a portion of the data sources may be locked to a data zone. As used herein, a data source that is locked to a data zone means a data source, or a portion thereof, may not be transmitted to computing devices that are not members of the data zone. For example, a cloud computing environment may host a medical record on a non-transitory storage of a computing device of the cloud computing environment. Access restrictions associated with medical records may lock the data to the cloud computing environment and prevent the medical records from being sent to a computing device of a different cloud computing environment.

FIG. 1A shows a system in accordance with one or more embodiments of the invention. The system may include clients (100), including clients (100A) through (100N), that request that computations be performed on data sources in data zones (110), including data zones (110A) through (110N). The clients (100) and data zones (110) may be operably connected. The operable connections may be implemented using any communication method or combination without departing from the invention. Each component of the system is discussed below.

The clients (100) may be computing devices. The computing devices may be, for example, mobile phones, tablet computers, laptop computers, desktop computers, servers, computing clusters, or cloud computing systems. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and/or the method illustrated in FIG. 3. The clients (100) may be other types of computing devices without departing from the invention.

The clients (100) may issue global computation requests to the data zones (110). A global computation request may request a computation result for data sources in any number of data zones (110). A global computation request may include: (i) a description of the computation to be performed and (ii) an identifier of the client so that the global computation result may be provided to the client specified by the identifier. For additional details regarding global computation requests, See FIG. 2A.

In one or more embodiments of the invention, the clients (100) may have access to a map (not shown) that specifies the data sources in the data zones (110). In one or more embodiments of the invention, the map may be a data structure that specifies the aforementioned information. The map may be stored on a non-transitory computer readable storage medium of any of the clients (100) or another computing device operably connected to the clients (100).

In one or more embodiments of the invention, the clients (100) may utilize the map to generate global computation requests. For example, the clients (100) may select a type of computation to be performed using the data sources specified by the map.

As discussed above, the clients (100) may send global computation requests to data zones (110). The data zones (110) may collaboratively perform computations to obtain computation results requested by the clients (100). More specifically, a data zone may issue intermediate computations to be performed by varying data zones. The issued intermediate computations may generate results based on: (i) data stored in the data zone in which the intermediate computation is performed and/or (ii) data stored in data zones in which the intermediate computation will not be performed. In turn, the results of the intermediate computations may be used to generate a global computation result. In a case where an intermediate computation generates a result based on data stored in data zones in which the intermediate computation will not be performed, the intermediate computation may issue additional global computations to the respective zones in which the data is stored to obtain results from the respective zone that is used to compute the intermediate computation result.

In one or more embodiments of the invention, the computing resources of the data zones (110) are computing devices. The computing devices may be, for example, mobile phones, tablet computers, laptop computers, desktop computers, servers, computing clusters, or cloud computing systems. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and/or the methods illustrated in FIGS. 4A-5. The computing resources of the data zones (110) may be other types of computing devices or virtual computing devices without departing from the invention. For example, a computing resource may be a virtual machine executing on a computing device.

In one or more embodiments of the invention, the computing resources of a first data zone are geographically separated from the computing resources of a second data zone. For example, a first data zone may be located in the US and the second data zone may be located in Canada.

In one or more embodiments of the invention, the computing resources of a first data zone are located adjacent to the computing resources of a second data zone. For example, the first and second data zone may include computing resources of a single computing cluster that are logically, rather than physically, separated.

Performing intermediate computations in data zones hosting data sources in which the intermediate computations are performed may reduce the computing resource cost of performing a global computation when compared to aggregating the data sources in a single zone and performing intermediate/global computations in the single data zone. For example, performing an intermediate computation in a data zone may result in an intermediate computation result of a much smaller size than the data on which the intermediate computation result is based. Thus, sending the intermediate computation result, rather than the data on which the intermediate computation result is based, may be more computing resource usage efficient. In one or more embodiments of the invention, each data zone may be a logical grouping of computing resources that stores data locked to the computing resources. The computing resources may be orchestrated to give rise to the functionality of the data zone described throughout this application.

In one or more embodiments of the invention, each data zone may store data, i.e., a data source that is locked to the data zone. As used herein, data that is locked to a data zone means data that may not be transmitted to computing resources that are not part of the logical grouping of computing resources defined by the data zone. Data may be locked to a data zone for any reason. For example, data may be locked to a data zone due to privacy concerns. In another example, data may be locked to a data zone due to the size of the data. In a further example, data may be locked to a data zone due to a restriction imposed on the data by an owner of the data. The data may be locked to a data zone due to other restrictions/reasons without departing from the invention.

In one or more embodiments of the invention, the data zones (110) may be organized as a logical network. In other words, each of the data zones may be a node of the logical network and/or computing network. To perform computations, computation requests from clients and/or data zones may be distributed via the logical network.

In one or more embodiments of the invention, each data zone may include a map of the logical network. The map may specify: (i) the topology of the network, (ii) the computing resources available to each data zone, and (iii) the data stored by each data zone. The map may include more, different, and/or less information without departing from the invention.

In one or more embodiments of the invention, the data zones (110) may send global and intermediate computation requests to other data zones to service global computation requests from clients and/or intermediate computations being performed to service global computation requests from clients. As used herein, an intermediate computation request refers to a request by a data zone to service a global computation request from a client or to service a global or an intermediate computation used to service a global computation request from a client. As noted above, each data zone may host one or more data sources. A computation request from a client may require performing computations on data sources stored in different data zones. To service a global computation request, the data zones may analyze the request and send appropriate intermediate computation requests to other data zones. Additionally, to service global and intermediate computation requests from other data zones, additional intermediate computation requests may be sent to additional data zones. Thus, servicing a global computation request may cause global and intermediate computation requests to be recursively sent to any number of data zones.

Figure 1B:
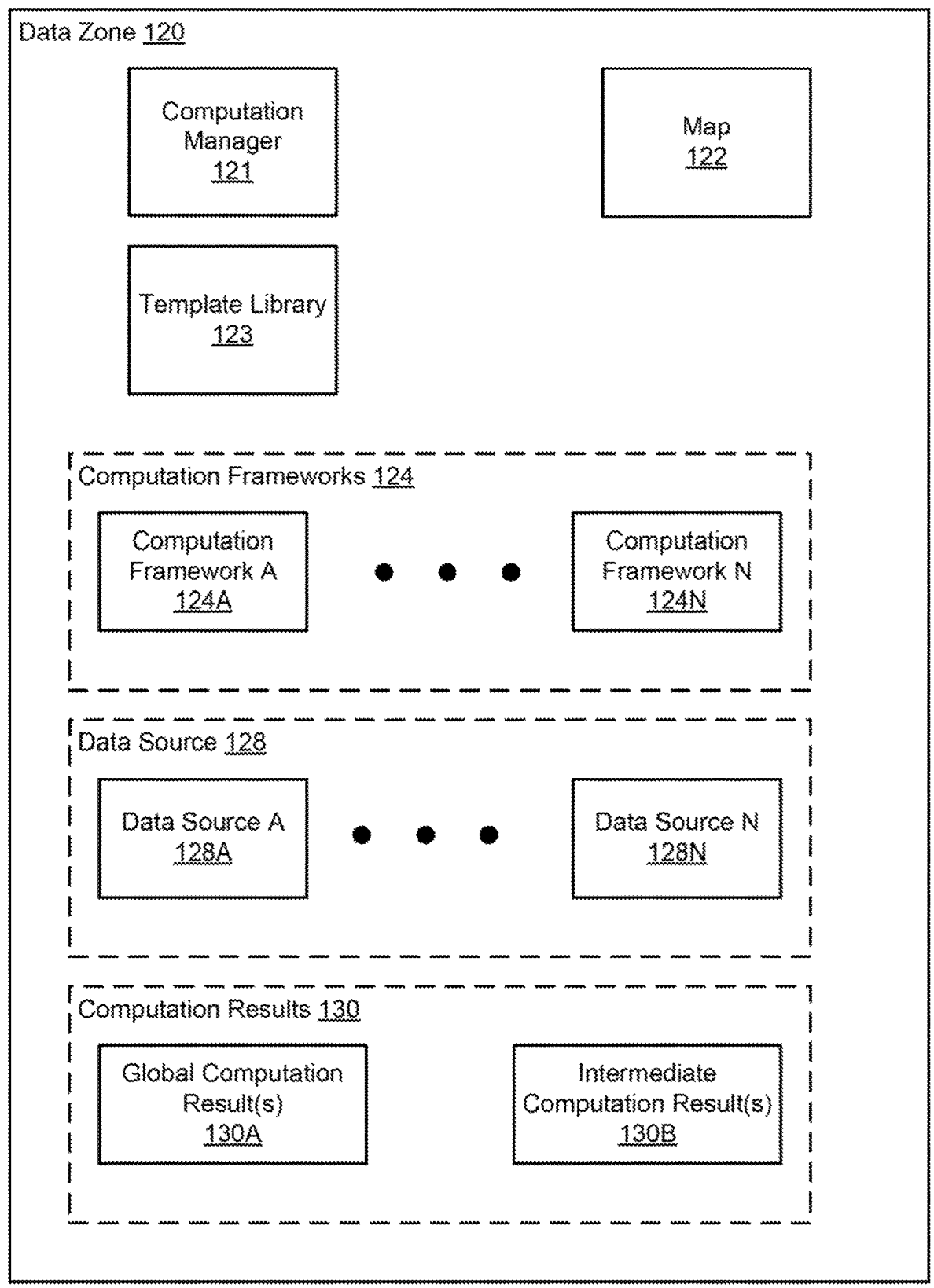
FIG. 1B shows a diagram of a data zone in accordance with one or more embodiments of the invention.

To further clarify the data zones (110), FIG. 1B shows an example of a data zone (120) in accordance with one or more embodiments of the invention. As noted above, the data zone (110) may: (i) perform computations to service client computation requests, (ii) store data sources, and (iii) instantiate intermediate computations to service global computation requests and/or other intermediate computations. The data zone (120) may provide additional, different, or less functionality without departing from the invention.

Figure 4A:
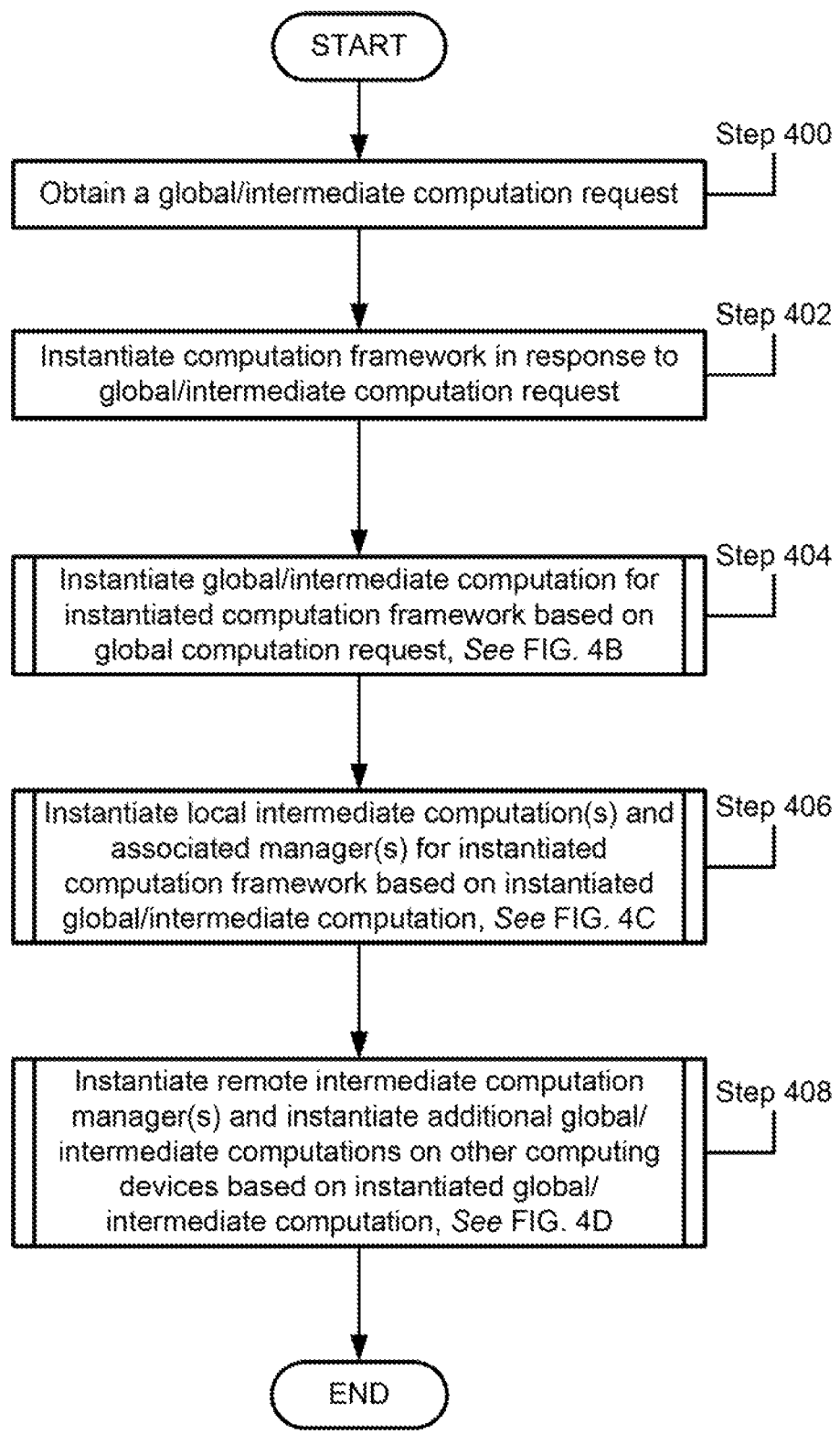
FIG. 4A shows a flowchart of a method of operating a data zone in accordance with one or more embodiments of the invention.
Figure 4B:
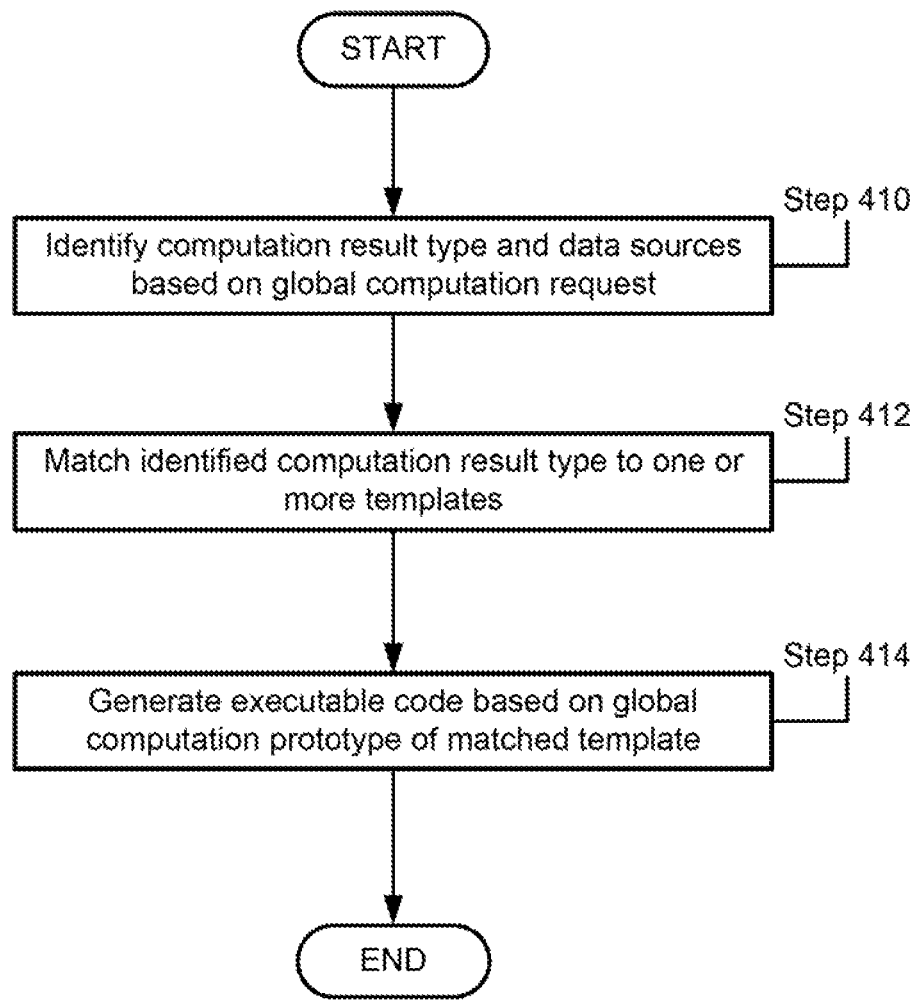
FIG. 4B shows a flowchart of a method of instantiating a computation framework and/or a global computation in accordance with one or more embodiments of the invention.
Figure 4C:
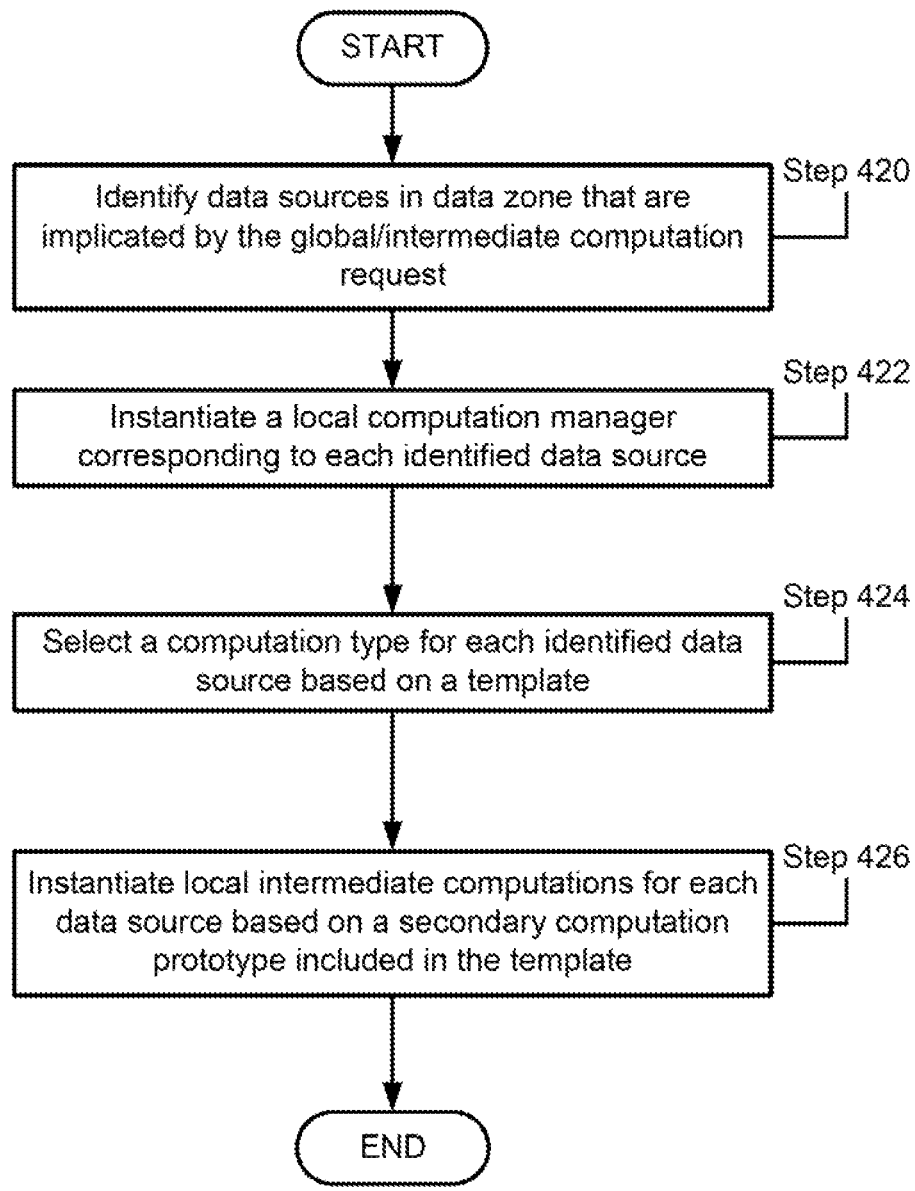
FIG. 4C shows a flowchart of a method of instantiating a local intermediate computation manager and/or a local intermediate computation in accordance with one or more embodiments of the invention.
Figure 4D:
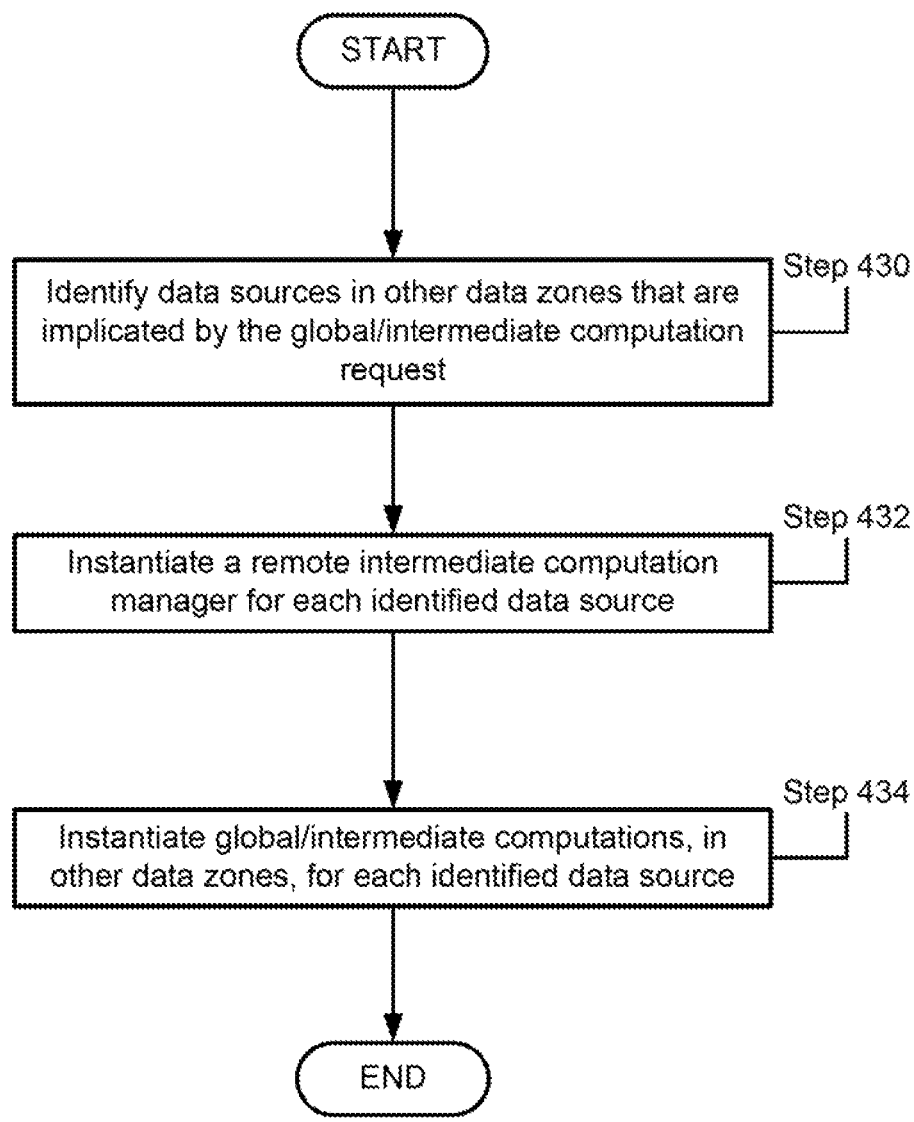
FIG. 4D shows a flowchart of a method of instantiating a remote intermediate computation manager and/or a local intermediate computation on another data zone in accordance with one or more embodiments of the invention.
Figure 5:
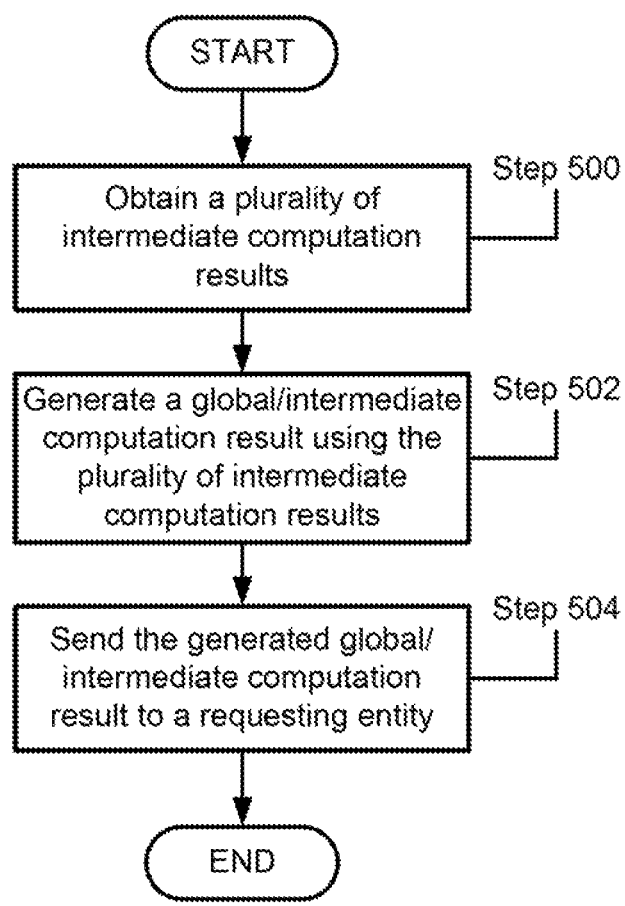
FIG. 5 shows a flowchart of a method of generating a global computation result in accordance with one or more embodiments of the invention.

In one or more embodiments of the invention, the data zone (120) is a logical computing device that utilizes the physical computing resources of one or more computing devices to provide the functionality of the data zone (120) described throughout this application and/or to perform the methods illustrated in FIGS. 4A-5. The data zone (120) may be, for example, a cloud computing system. The data zone (120) may include computing resources derived from the physical computing resources of the computing devices utilized by the data zone (120).

In one or more embodiments of the invention, the data zone (120) includes computing resources that provide processing (e.g., computations provided by a processor), memory (e.g., transitory storage provided by RAM), and persistent storage (e.g., non-transitory storage provided by a hard disk drive) by utilizing the physical computing resources of the computing devices of the data zone (120). In one or more embodiments of the invention, the data zone (120) may include instructions stored on a persistent storage of a computing device of the data zone that when executed by a processor of the data zone provides the functionality of the data zone (120) described throughout this application and/or the methods illustrated in FIGS. 4A-5.

In one or more embodiments of the invention, the computing devices utilized by the data zone (120) are operably connected to each other and/or operably connected to computing devices of other data zones. For example, each of the computing devices of the data zone (120) may include a network interface that enables packets to be sent via a network to other computing devices of the data zone (120) or other data zones.

To provide the aforementioned functionality of the data zone (120), the data zone (120) may include a computation manager (121) that instantiates/manages instances of computation frameworks (124), including computation frameworks (124A) through (124N), executing using computing resources of the data zone (120), a map (122) that specifies the locations/types of data stored in data zones, a template library (123) used to instantiate computations, data sources (128), including data sources (128A) through (128N), stored using computing resources of the data zone (120), and computing results stored as computation results (130), including global computation results (130A) and intermediate computation results (130B). Each component of the data zone (120) is discussed below.

In one or more embodiments of the invention, the computation manager (121) responds to upstream computation requests. The computation manager (121) may respond to the upstream computation requests by instantiating computing frameworks (124). The computation frameworks (124) may generate computation results (130) specified by the upstream computation requests.

As used herein, an upstream computation request refers to any computation request received from another data zone or client. In one or more embodiments of the invention, an upstream computation request is a global computation request sent from a client. In one or more embodiments of the invention, the upstream computation request is an intermediate computation request generated by a computing device of another data zone.

As used herein, an intermediate computation request refers to a computation request generated by a data zone. The intermediate computation requests may be generated by computation frameworks, as will be discussed in greater detail with respect to FIG. 1C.

As used herein, instantiating a computation framework means to start one or more processes that perform the functionality of a computation framework as will be discussed in greater detail with respect to FIG. 1C. The processes may execute using computing resources in the data zone (120). In one or more embodiments of the invention, the computation frameworks (124) may be instantiated based on a template of the template library (123). The template may specify components and/or functionality of a computation framework. For additional details regarding templates and the template library (123), See FIGS. 2C and 2D.

In one or more embodiments of the invention, the computation manager (121) is implemented as one or more processes executing using computing resources of the data zone (120) based on computer instructions stored on a non-transitory computer readable media. The computing instructions, when executed using processing computing resources of the data zone (120) cause computing device(s) of the data zone (120) to perform the functions of the framework manager (122) and/or all or a portion of the methods illustrated in FIGS. 4A-4E.

In one or more embodiments of the invention, the computation frameworks (124) may service upstream computation requests. The computation frameworks (124) may service the upstream requests by generating computation results (130) and/or providing generated computation results (130) to the requesting entity. In one or more embodiments of the invention, the computation results (130) may be stored in a cache of the data zone (120). For additional details regarding the computation frameworks (124), See FIG. 1C.

The data sources (128) and computation results (130) may be data stored using computing resources of the data zone (120). The data zone (120) may store additional, different types, and/or less data without departing from the invention. Each type of the aforementioned data is discussed below.

In one or more embodiments of the invention, each data source (128A, 128N) of the data sources (128) is data stored in the data zone (120) that may not be transmitted to computing devices that are not a part of the data zone (120). As discussed above, the data sources (128) may not be transmitted to computing devices that are not a part of the data zone (120) for any reason without departing from the invention. For example, a data source may include private data that is restricted from being transmitted outside of the data zone (120). In another example, the data source may include data that is prohibitively expensive to transmit to another data zone. In a further example, not transmitting the data of the data source to another data zone may save bandwidth cost, reduce the likelihood of the data source being intercepted or otherwise exposed when transmitting the data source, and/or reduce the computation cost of performing a computation by having the computation be performed in a data zone that provides lower cost computations. The data sources (128) may be used, in part, by computation frameworks (124) to generate computation results (130).

In one or more embodiments of the invention, the data sources (128) have varying formats. For example, a first data source may be in a database format while a second data source may be in a table format. Some of the data sources may have the same format without departing from the invention.

In one or more embodiments of the invention, the data sources (128) may be dynamic. In other words, the content of each data source may be changing over time. For example, a source may include data from a sensor being streamed to a computing device of the data zone (120).

In one or more embodiments of the invention, each data source may have an associated identifier (not shown). The identifier may associate the data source, or a portion thereof, with one or more other data sources, or portions thereof, stored in the data zone (120) and/or other data zones. The identifier may be, for example, a time stamp, a data source, an identifier of a data zone in which the data source is stored, a data format, a data type, a size of the data source, or another characteristic. In one or more embodiments of the invention, the identifier of a data source may be stored as metadata associated with the data source.

In one or more embodiments of the invention, the computation results (130) may be result(s) of computations performed by the computation frameworks (124). In one or more embodiments of the invention, the computation results (130) may be able to be transmitted to computing devices of other data zones, in contrast to the locked data sources (128) which cannot be transmitted to computing devices of other data zones.

The computation results (130) may include global computation results (130A) that reflect the result of performing global computations and local intermediate computation results (130B) that reflect the result of performing intermediate computations.

In one or more embodiments of the invention, each computation result may have an associated identifier. The result identifier, much like an identifier of a data source, may associate the computation result with one or more computation results stored in the data zone (120) and/or other data zones. In one or more embodiments of the invention, the result identifier may associate the computation result with one or more data sources stored in the data zone (120) and/or other data zones. The result identifier may associate the computation result with any number of data sources and/or computation results stored in the data zone (120) and/or other data zones without departing from the invention. The result identifier may be, for example, a time stamp, a data source from which the result was generated, an identifier of a data zone in which the computation result is stored, a data format of the computation result, a data type of the computation result, a size of the computation result, or another characteristic of the computation result. In one or more embodiments of the invention, the result identifier of a computation result may be stored as metadata associated with the computation result.

In one or more embodiments of the invention, the result identifier may include multiple time stamps that may specify one or more of the following: the time at which the computation result was generated, the time at which the computation result was stored in a cache, and the time at which a computation that generated the computation result was instantiated. The result identifier may include additional and/or fewer time stamps that specify other characteristics of the computational result without departing from the invention.

As discussed above, the computation frameworks (124) may generate computation results (130). FIG. 1C shows an example of a computation framework (150) in accordance with one or more embodiments of the invention. The computation framework (150) includes a computation manager (152), a global or intermediate computation (154), local intermediate computation managers (156) including local intermediate computation managers (156A through (156N local intermediate computations (158) including local intermediate computations (158A) through (158N), and remote intermediate computation managers (160) including remote intermediate computation managers (160A) through (160N). Each component of the computation framework (150) is discussed below.

In one or more embodiments of the invention, the computation manager (152) instantiates: (i) a global or intermediate computation (154), (ii) local intermediate computation managers (156), and/or (iii) remote intermediate computation managers (160). The aforementioned computations and/or managers may be instantiated by the computation manager (152) to service an upstream computation request which triggered the instantiation of the computation framework (150). Instantiating the framework (150) may include instantiating the computation manager (152).

In one or more embodiments of the invention, the computation manager (152) may instantiate a global computation or an intermediate computation based on a requested computation result specified by a computation request. For example, a global computation request received from a client may result in a global computation to be instantiated. In another example, an intermediate computation request received from a client may result in an intermediate computation to be instantiated.

In one or more embodiments of the invention, the global/intermediate computation (154) may be instantiated based on a template. The template may be part of a template library that includes any number of templates. For additional details regarding templates, See FIGS. 2C-2D.

In one or more embodiments of the invention, the global computation (154) may generate a global computation result using: (i) local intermediate computation results generated by the local intermediate computations (154) and/or (ii) global or local intermediate computation results generated by other data zones.

In one or more embodiments of the invention, the global/intermediate computation result may be stored as a computation result after being generated. In one or more embodiments of the invention, the global computation result may be sent to a requesting entity.

In one or more embodiments of the invention, the local intermediate computation managers (156) may be instantiated by the computation manager (152). The local intermediate computation managers (156) may instantiate local intermediate computations (158) to generate local intermediate computation results used by the global/intermediate computation (154) to generate a global computation result.

In one or more embodiments of the invention, the local intermediate computation managers (156) may instantiate local intermediate computations (158) based on a corresponding input to the global/intermediate computation (154). For example, when a global computation is instantiated, it may be based on a template. The resulting global computation may take, as input, one or more intermediate computation results. The template, on which the global computation is based, may also provide intermediate computation prototypes on which the intermediate computations are based.

Templates may be selected based on a computation type implicated by a global computation request. As used herein, a computation type refers to a method of implementing and processing a data set that generates a desired result. The data set may be, for example, a data source. The desired result may be, for example, an average, a standard of deviation, a histogram, etc.

In one or more embodiments of the invention, the remote intermediate computation managers (160) may instantiate computation frameworks in other data zones. The instantiated computation frameworks may generate a global computation result or an intermediate computation result and provide the aforementioned computation result to the corresponding remote intermediate computation manager.

In one or more embodiments of the invention, the frameworks in other data zones may be instantiated based on a set of criteria, including: (i) the availability of a data source in the data zone and (ii) the data sources implicated by the global computation request.

In one or more embodiments of the invention, the computation manager (152), global computation (154), local intermediate computation managers (156), local intermediate computations (158), and remote intermediate computation managers (160) are implemented as computer instructions, e.g., computer code, stored on a non-transitory storage that is executed using processing resources of the data zone (120, FIG. 1B). The computer instructions associated with each of the aforementioned computations and managers when executed by the processing resources of the data zone (120, FIG. 1B) may generate one or more processes executing on the data zone (120, FIG. 1B) that provide the functionality of each of the aforementioned computations and managers. In other embodiments of the invention, the aforementioned computations and managers may be implemented as hardware devices such as, for example, programmable gate arrays, application specific integrated circuits, or other electronic devices including circuitry that provide the aforementioned functionality.

Figure 2A:
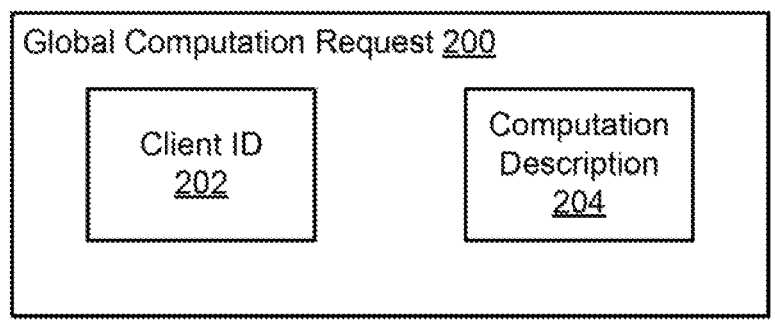
FIG. 2A shows a diagram of an example global computation request in accordance with one or more embodiments of the invention.
Figure 2B:
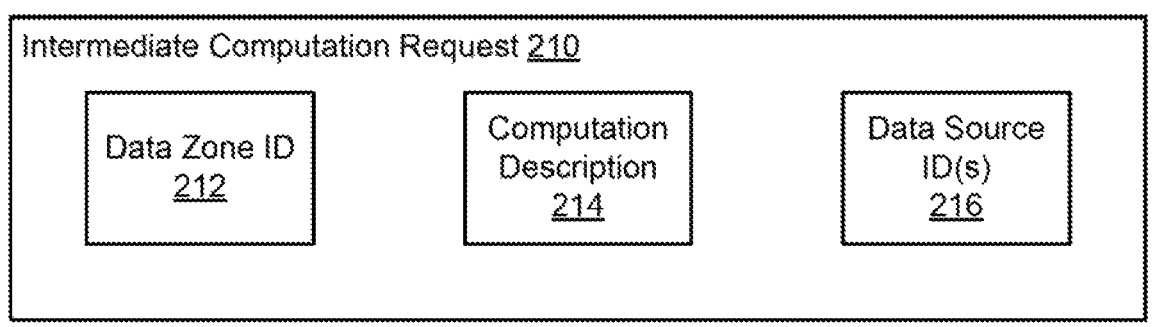
FIG. 2B shows a diagram of an example intermediate computation request in accordance with one or more embodiments of the invention.
Figure 2C:
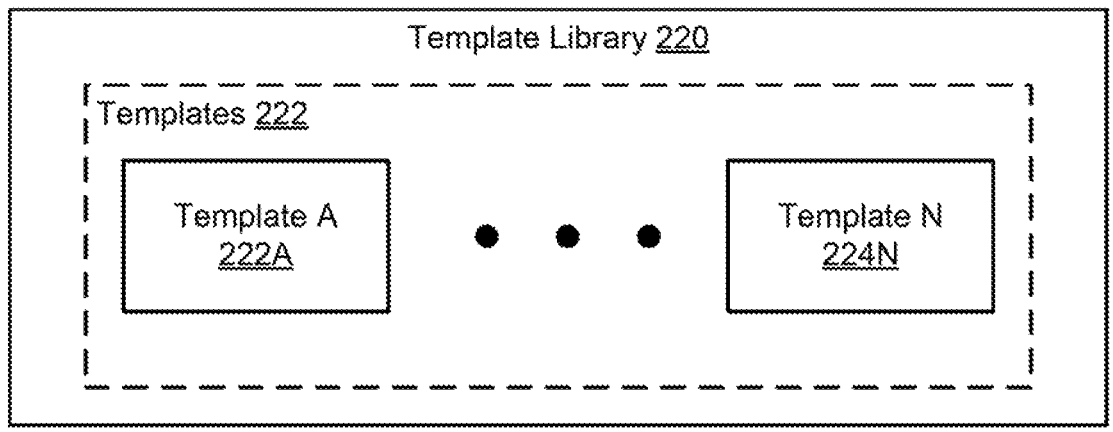
FIG. 2C shows a diagram of a template library in accordance with one or more embodiments of the invention.
Figure 2D:
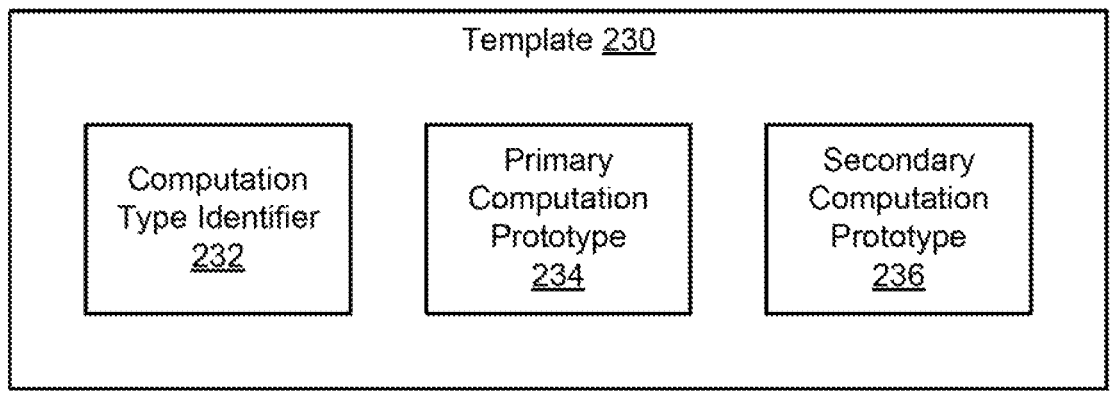
FIG. 2D shows a diagram of an example template in accordance with one or more embodiments of the invention.

To further clarify aspects of the invention, FIGS. 2A-2D show data structures utilized by clients (100, FIG. 1A) and data zones (110, FIG. 1A) in accordance with one or more embodiments of the invention. More specifically, FIGS. 2A-2B show examples of data structures utilized by clients and data zones, respectively, to communicate computation requests to data zones. FIGS. 2C-2D show examples of data structures used by data zones to instantiate global computation and/or intermediate computations.

FIG. 2A shows an example of a global computation request (200) in accordance with one or more embodiments of the invention. The global computation request (200) may be sent by a client to a data zone to initiate a computation across all or a portion of the data zones. The global computation request (200) may include a client identifier (202) and a computation description (204). Each component of the example global computation request (200) is discussed below.

The client identifier (202) may be an identifier of the client to which a result of the computation specified by the global computation request (200) is to be returned. In one or more embodiments of the invention, the client identifier (202) is an identifier of the client that generated the global computation request (200). In one or more embodiments of the invention, the client identifier (202) is a media access control address of the client that generated the global computation request (200). The client identifier (202) may be a media access control address of a client that did not generate the global computation request (200) without departing from the invention.

The computation description (204) may be a description of the global computation result desired by the requesting entity. For example, the computation description (204) may indicate that an average of a number of values stored in various data zones is being requested by the requesting entity. The computation description (204) may indicate any type of computation without departing from the invention.

FIG. 2B shows an example of an intermediate computation request (210) in accordance with one or more embodiments of the invention. The intermediate computation request (210) may be sent by a data zone to another data zone to initiate a computation in the other data zone. The intermediate computation request (210) may include a data zone identifier (212), a computation description (214), and one or more data source identifiers (216). Each component of the example intermediate computation request (210) is discussed below.

The data zone identifier (212) may be an identifier of the data zone to which a result of the computation specified by the intermediate computation request (210) is to be returned. In one or more embodiments of the invention, the data zone identifier (212) is an identifier of a data zone that is performing a global or intermediate computation that will use the result of the requested computation as an input. In one or more embodiments of the invention, the data zone identifier (212) is a media access control address of a computing device of the data zone that generated the intermediate computation request (210). The data zone identifier (212) may be a media access control address of a computing device of a data zone that did not generate the intermediate computation request (210) without departing from the invention.

The computation description (214) may be a description of the intermediate computation result desired by the requesting entity. For example, the computation description (214) may indicate that an average of a number of values stored in the data zone is being requested by the requesting entity. The computation description (214) may indicate any type of computation without departing from the invention.

The data source identifier(s) (216) may identify data sources of the data zone and/or other data zones to be used as input for the computation to be performed. The data source identifier (216) may be, for example, a file name, a type of data, a file type, or any other characteristic of stored data.

FIG. 2C shows an example of a template library (220) in accordance with one or more embodiments of the invention. The template library (220) may include a number of templates (222), including templates (222A) through (222N). The templates may be used by data zones to instantiate computations. Each data zone may include a copy of the template library (220), or a portion thereof.

FIG. 2D shows an example of a template (230). The template (230) may include a computation type identifier (232), a primary computation prototype (234), and a secondary computation prototype (236). Each template of the template library (220, FIG. 2C) may include similar information.

The computation type identifier (232) may be an identifier of a computation type that may be instantiated using the template (230). The identifier may be used by a data zone to determine which template from the template library is used to instantiate a global/intermediate computation and/or local or remote global/intermediate computations. For example, a global computation request may include a description of a computation result. The computation result may be matched to an identifier of a template of the template library (220, FIG. 2C) to identify a template that may be used to instantiate the computation that will provide the computation result requested by the client.

In one or more embodiments of the invention, the computation type identifier (232) may be a name of a type of computation. The name may be, for example, an average, a standard deviation, a histogram, etc.

The primary computation prototype (234) may be computer instructions, e.g., computer code. The computer instructions may be modifiable at runtime or compilation to be linked to data sources to be used as input and to store results at specifiable locations. For example, the data sources may be passed by value or reference to the computer instructions and a result may be returned by the computer instructions. The computer instructions may generate a result that reflects a specific type of computation, e.g., an average, a standard of deviation, a histogram, etc., as requested by a requestor.

In one or more embodiments of the invention, instantiating a primary computation of the computation type associated with the template (230) may be accomplished by generating an instance of the primary computation prototype (234) that operates on data generated by computation(s) based on the secondary computation prototype (236).

The secondary computation prototype (236) may be computer instructions, e.g., computer code. The computer instructions may be modifiable at runtime or compilation to be linked to data sources to be used as input and to store results at specifiable locations. For example, the data sources may be passed by value or reference to the computer instructions and a result may be returned by the computer instructions. The computer instructions may generate a result that reflects a specific type of computation, e.g., an average, a standard of deviation, a histogram, etc., used to generate a computation result necessary to perform a primary computation prototype. In other words, the secondary computation prototype (236) may be used to instantiate the computations necessary to generate the results used by the primary computation prototype to generate a computation result.

In one or more embodiments of the invention, instantiating a secondary computation of the computation type associated with the template (230) may be accomplished by generating an instance of the secondary computation prototype (236) that operates on data sources specified by the computation request.

In one or more embodiments of the invention, the primary computation prototype (234) may be used to instantiate a global/intermediate computation (154, FIG. 1C) of a computation framework. In one or more embodiments of the invention, the secondary computation prototype (236) may be used to instantiate a local intermediate computation (158, FIG. 1C) of a computation framework.

To further clarify aspects of templates, three examples of templates are discussed below. Each of the following examples is included for explanatory purposes. The examples include templates for computing a global average, computing a global min/max value, and computing a set of min/max values. Templates may be used to implement other types of computations without departing from the invention. For example, a template may be used to calculate a standard deviation or histograms without departing from the invention.

Example Global Average Template

Intermediate Computation Prototype—

Compute the sum of all values present in a data source, referred to as $Sum_i$.

Count the number of items summed in the data source, referred to as $Count_i$.

Returns a value pair, referred to as $ValPair_i = <Sum_i, Count_i>$.

Global Computation Prototype—

Obtain value pairs generated by all of the intermediate computations and generate a set of value pairs, referred to as $ValPairSet_n = \{ValPair_1, ValPair_2, \ldots, ValPair_n\}$, which can be also represented by $ValPairSet_n = \{<Sum_1, Count_1>, <Sum_2, Count_2>, \ldots, <Sum_n, Count_n>\}$.

Calculate the sum of the sums and the sum of the counts; generate another value pair, referred to as $$ValPair_g = \left\langle \sum_{i=1}^{i=n} Sum_i, \sum_{i=1}^{i=n} Count_i \right\rangle = \langle Sum_g, Count_g \rangle.$$

Generate the global average by dividing the sum of the sums by the sum of the counts, represented as: $Average_{global} = Sum_g / Count_g$.

Example Global Min/Max Template

Intermediate Computation Prototype—

Compute the minimum and the maximum of all values present in a data source, referred to as $Min_i$ and $Max_i$.

Returns a value pair, referred to as $ValPair_i = <Min_i, Max_i>$.

Global Computation Prototype—

Obtain the value pairs for all intermediate computations and generate a set of value pairs, referred to as $ValPairSet_n = \{ValPair_1, ValPair_2, \ldots, ValPair_n\}$, which can be also represented by $ValPairSet_n = \{<Min_1, Max_1>, <Min_2, Max_2>, \ldots, <Min_n, Max_n>\}$.

Compute the minimum of the minimums and the maximum of the maximums, generate another value pair, referred to as $ValPair_g = <\min_{i=1 \text{ to } n} Min_i, \max_{i=1 \text{ to } n} Max_i> = <Min_g, Max_g>$.

Example Global Min/Max Set Template

Intermediate Computation Prototype—

Compute the set of m minimum and the maximum of all values present in a data source $d_i$, referred to as $MinSet_i^m$ and $MaxSet_i^m$. These sets can be also represented as a sorted list in increasing order, where:

$Minset_i^m = \langle Min_i^1, Min_i^2, \ldots, Min_i^m \rangle$, where $Min_i^k \leq Min_i^j, \forall k < j$.

$MaxSet_i^m = \langle Max_i^1, Max_i^2, \ldots, Max_i^m \rangle$, where $Max_i^k \leq Max_i^j, \forall k < j$.

Returns a value pair, referred to as $ValPairSets_i^m = <MinSet_i^m, MaxSet_i^m>$.

Global Computation Prototype—

Obtain the value pairs for all intermediate computations and generate a set of value pairs, referred to as $ValPairSets_i^n = \{ValPairSets_1^m, ValPairSets_2^m, \ldots, ValPairSets_i^m\}$, which can be also represented by $$ValPairSets_n^m = \begin{cases} \langle MinSet_1^m, MaxSet_1^m \rangle, \\ \langle MinSet_2^m, MaxSet_2^m \rangle, \\ \ldots, \\ \langle MinSet_n^m, MaxSet_n^m \rangle \end{cases}$$

Compute the set of minimums of the minimums and the set of maximums of the maximums, creating another value pair, referred to as:

$$ValPairSets_g^m = \begin{cases} MinSet_g^m, \\ MaxSet_g^m \end{cases}$$

$$ValPairSets_g^m = \begin{cases} \langle Min_g^1, Min_g^2, \ldots, Min_g^m \rangle, \\ \langle Max_g^1, Max_g^2, \ldots, Max_g^m \rangle \end{cases}, \text{ where }$$

Let $MinAllSet_g^{m \times n} = \bigcup_{k=1}^{n} MinSet_i^m$

Let $MaxAllSet_g^{m \times n} = \bigcup_{k=1}^{n} MaxSet_i^m$

Figure 3:
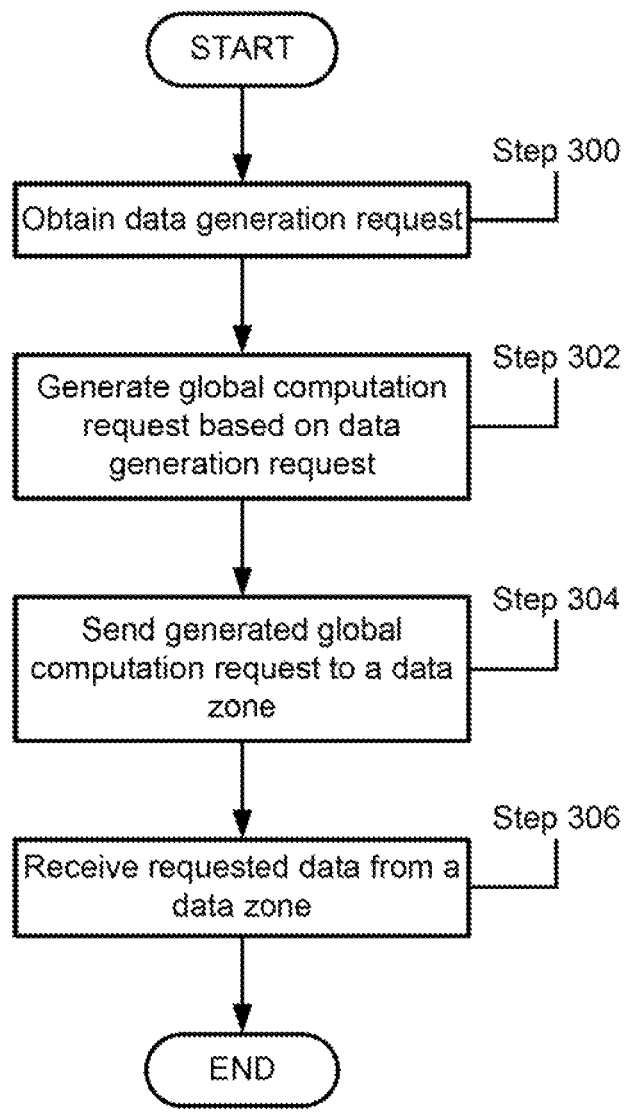
FIG. 3 shows a flowchart of a method of obtaining a global computation result in accordance with one or more embodiments of the invention.

Let $MinSet_g^m$=minimum m values in $MinAllSet_g^{m \times n}$, sorted in increasing order Let $MaxSet_g^m$=maximum m values in $MaxAllSet_g^{m \times n}$, sorted in increasing order As discussed above, the data zones (110, FIG. 1A) may perform computations in response to requests from the clients (100, FIG. 1A) or other data zones. FIGS. 3-5 show methods in accordance with one or more embodiments of the invention to initiate computations or perform computations.

While illustrated as separate methods, each of the methods illustrated in FIGS. 3-5 may be performed sequentially or in parallel (or a combination of both serial and parallel execution) without departing from the invention. Further, one of ordinary skill will appreciate that some or all of these steps may be executed in different orders, may be combined or omitted, and some or all of the steps may be executed in parallel.

FIG. 3 shows a flowchart of a method in accordance with one or more embodiments of the invention. The method depicted in FIG. 3 may be used to initiate a computation in accordance with one or more embodiments of the invention. The method shown in FIG. 3 may be performed by, for example, a client (100, FIG. 1A). Other components of the system illustrated in FIG. 1A may perform the method of FIG. 3 without departing from the invention.

In Step 300, a data generation request is obtained.

In one or more embodiments of the invention, the data generation request may be obtained from an application executing on a client. In one or more embodiments of the invention, the data generation request is obtained from a second client operably linked to a first client that obtained the data generation request. In one or more embodiments of the invention, the data generation request is obtained from a data zone.

In Step 302, a global computation request is generated based on the obtained data generation request.

In one or more embodiments of the invention, the generated global computation request specifies the requesting entity and a computation to be performed. In one or more embodiments of the invention, the generated global computation request may further specify grouping criteria. The grouping criteria may enable data sources of data zones on which the global computation is to be performed to be identified. In one or more embodiments of the invention, the grouping criteria is a data type. In one or more embodiments of the invention, the grouping criteria is an identifier of one or more data sources. In one or more embodiments of the invention, the request may be the same as the request shown in FIG. 2A.

In Step 304, the generated global computation request is sent to a data zone.

In Step 306, the requested data is obtained from a data zone. The data zone of Step 306 may be the same or different from the data zone in Step 304.

The method may end following Step 306.

FIG. 4A shows a flowchart of a method in accordance with one or more embodiments of the invention. The method depicted in FIG. 4A may be used to perform a computation in accordance with one or more embodiments of the invention. The method shown in FIG. 4A may be performed by, for example, a data zone (110, FIG. 1A). Other components of the system illustrated in FIG. 1A may perform the method of FIG. 4A without departing from the invention.

In Step 400, a global computation request or an intermediate computation request is obtained.

In one or more embodiments of the invention, the global computation request is obtained from a client. In one or more embodiments of the invention, the global/intermediate computation request is obtained from a data zone. In one or more embodiments of the invention, the global computation request may have a format that is the same as the global computation request shown in FIG. 2A. In one or more embodiments of the invention, the intermediate computation request may have a format that is the same as the intermediate computation request shown in FIG. 2B.

In Step 402, a computation framework is instantiated in response to obtaining the global/intermediate computation request.

Figure 1C:
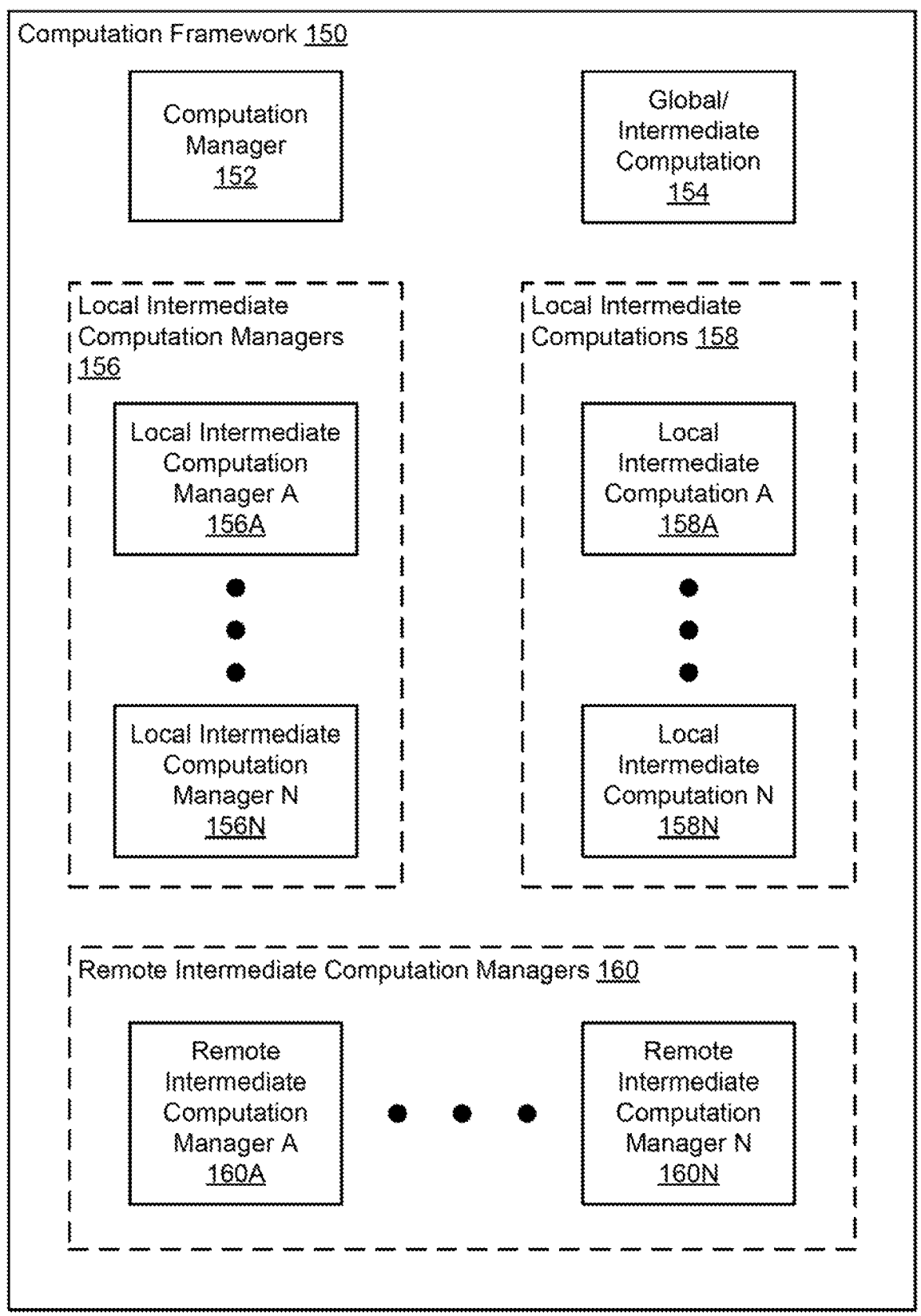
FIG. 1C shows a diagram of a computation framework in accordance with one or more embodiments of the invention.

In one or more embodiments of the invention, instantiating the computation framework includes generating a computation manager (e.g., 152, FIG. 1C).

In Step 404, a global/intermediate computation of the instantiated computation framework is instantiated based on the obtained global/intermediate computation request.

In one or more embodiments of the invention, the global/intermediate computation is instantiated by the computation manager. To instantiate the global/intermediate computation, the computation manager may identify a computation type specified by the obtained global/intermediate computation request and instantiate the global/intermediate computation using a template that matches the identified computation type.

In one or more embodiments of the invention, the global/intermediate computation may be instantiated using the method illustrated in FIG. 4B. The global/intermediate computation may be instantiated using other methods without departing from the invention.

In Step 406, local intermediate computation managers and local intermediate computations are instantiated based on the instantiated global/intermediate computation.

In one or more embodiments of the invention, the computation manager may instantiate the local intermediate computation managers. In turn, each of the local computation managers may instantiate a corresponding local intermediate computation based on the template matched in Step 404.

In one or more embodiments of the invention, the instantiated local intermediate computations generate computation results based on data sources of the data zone in which the local intermediate computations are being performed. In one or more embodiments of the invention, the type of local intermediate computation is selected based on the matched template in Step 404.

In one or more embodiments of the invention, the local intermediate computation managers and local intermediate computations are instantiated using the method illustrated in FIG. 4C. The local intermediate computation managers and local intermediate computations may be instantiated using other methods without departing from the invention.

In Step 408, remote intermediate computation managers are instantiated and additional global/intermediate computations are instantiated on other computing devices based on the instantiated global/intermediate computation.

In one or more embodiments of the invention, the remote intermediate computation managers instantiate the intermediate computations in other data zones. As noted above, the computation manager may instantiate the global/intermediate computation using a template. The template may provide a prototype for the global/intermediate computation and local intermediate computations. The remote intermediate computation managers may receive intermediate computation results from the intermediate computations in other data zones that were instantiated by the remote intermediate computation managers. The aforementioned results may then be used as input to a global/intermediate computation to obtain a global computation result.

In one or more embodiments of the invention, the remote intermediate computation managers and intermediate computations on other data zones may be instantiated using the method illustrated in FIG. 4D. The remote intermediate computation managers and intermediate computations on other data zones may be instantiated using other methods without departing from the invention.

The method may end following Step 408.

As seen in Step 408, remote intermediate computation managers may be instantiated in response to either (i) global computation requests or (ii) intermediate computation requests. The remote intermediate computation managers may generate additional global/intermediate computation requests. Thus, the method illustrated in FIG. 4A may provide a method of recursively instantiating global/intermediate computations in any number of data zones.

FIG. 4B shows a flowchart of a method in accordance with one or more embodiments of the invention. The method depicted in FIG. 4B may be used to instantiate a global/intermediate computation in accordance with one or more embodiments of the invention. The method shown in FIG. 4B may be performed by, for example, a data zone (110, FIG. 1A). Other components of the system illustrated in FIG. 1A may perform the method of FIG. 4B without departing from the invention.

In Step 410, a computation result type and data sources are identified based on the obtained global/intermediate computation request.

In one or more embodiments of the invention, the computation result type and/or data sources may be specified in the obtained global computation request.

In Step 412, the identified computation result type is matched to one or more templates.

In one or more embodiments of the invention, the one or more templates may be one or more templates of a library of templates. Each template in the library may match types of computation result types. In one or more embodiments of the invention, each template in the library may match to a computation result type that is different from the computation result type that the other templates in the library match.

In one or more embodiments of the invention, multiple templates in the library match to a computation result type. In a scenario in which multiple templates match a computation result type, the contents of each of the matched templates may be used to generate executable code.

In Step 414, executable code may be generated based on a primary computation prototype of the matched template.

In one or more embodiments of the invention, generated executable code operates on the data sources identified in Step 410 to generate a global/intermediate result. The data sources may be data sources of data zones or intermediate computation results, i.e., computation results.

The method may end following Step 414.

FIG. 4C shows a flowchart of a method in accordance with one or more embodiments of the invention. The method depicted in FIG. 4C may be used to instantiate local intermediate computation managers and local intermediate computations in accordance with one or more embodiments of the invention. The method shown in FIG. 4C may be performed by, for example, a data zone (110, FIG. 1A). Other components of the system illustrated in FIG. 1A may perform the method of FIG. 4C without departing from the invention.

In Step 420, data sources of a data zone are identified based on the global/intermediate computation request.

In Step 422, a local computation manager is instantiated for each identified data source.

In Step 424, a computation type is selected for each local computation manager based on a template.

In one or more embodiments of the invention, the template may be the same template used to facilitate instantiating the global/intermediate computation discussed in FIG. 4B. The template may include an intermediate computation prototype.

In Step 426, the local computations are instantiated for each data source based on a secondary computation prototype included in the template.

In one or more embodiments of the invention, the intermediate computation template includes executable code. The local computations are instantiated by generating separate instances of the executable code that operate on the respective data sources and each instance generates a separate intermediate computation result.

The method may end following Step 426.

FIG. 4D shows a flowchart of a method in accordance with one or more embodiments of the invention. The method depicted in FIG. 4D may be used to instantiate remote intermediate computation managers and intermediate computations on other data zones in accordance with one or more embodiments of the invention. The method shown in FIG. 4D may be performed by, for example, a data zone (110, FIG. 1A). Other components of the system illustrated in FIG. 1A may perform the method of FIG. 4D without departing from the invention.

In Step 430, data sources in other data zones that are implicated by the global/intermediate computation request are identified.

In one or more embodiments of the invention, the data sources in other data zones are implemented by matching a grouping criteria specified in the global computation request.

In Step 432, a remote intermediate computation manager is instantiated for each identified data source.

In Step 434, a global/intermediate computation is instantiated in another data zone for each data source identified in Step 430. The instantiated computations may be local intermediate computations or global computations, depending on the type of data implicated by the global computation request.

In one or more embodiments of the invention, the intermediate computation is instantiated as a portion of a computation framework executing in the corresponding data zone. In one or more embodiments of the invention, each instantiated computation is based on a template having a computation type identifier that matches the computation type specified by the global/intermediate computation request. In one or more embodiments of the invention, the template is the same template matched in Step 412 of FIG. 4B.

The method may end following Step 434.

FIG. 5 shows a flowchart of a method in accordance with one or more embodiments of the invention. The method depicted in FIG. 5 may be used to obtain a global/intermediate computation result in accordance with one or more embodiments of the invention. The method shown in FIG. 5 may be performed by, for example, a data zone (110, FIG. 1A). Other components of the system illustrated in FIG. 1A may perform the method of FIG. 5 without departing from the invention.

In Step 500, intermediate computation results are obtained.

In one or more embodiments of the invention, the intermediate computation results are obtained from other data zones. In one or more embodiments of the invention, elements of the data source used to generate the intermediate computation result cannot be obtained using the intermediate computation result.

In Step 502, a global computation result or an intermediate computation result is generated using the obtained intermediate computation results.

In one or more embodiments of the invention, the global/intermediate computation result is obtained from a global/intermediate computation using the obtained global/intermediate computation results. In one or more embodiments of the invention, the elements of data sources used to generate the obtained intermediate computation results cannot be obtained using the global computation result.

In Step 504, the global/intermediate computation is sent to a requesting entity.

The method may end following Step 504.

Figure 6:
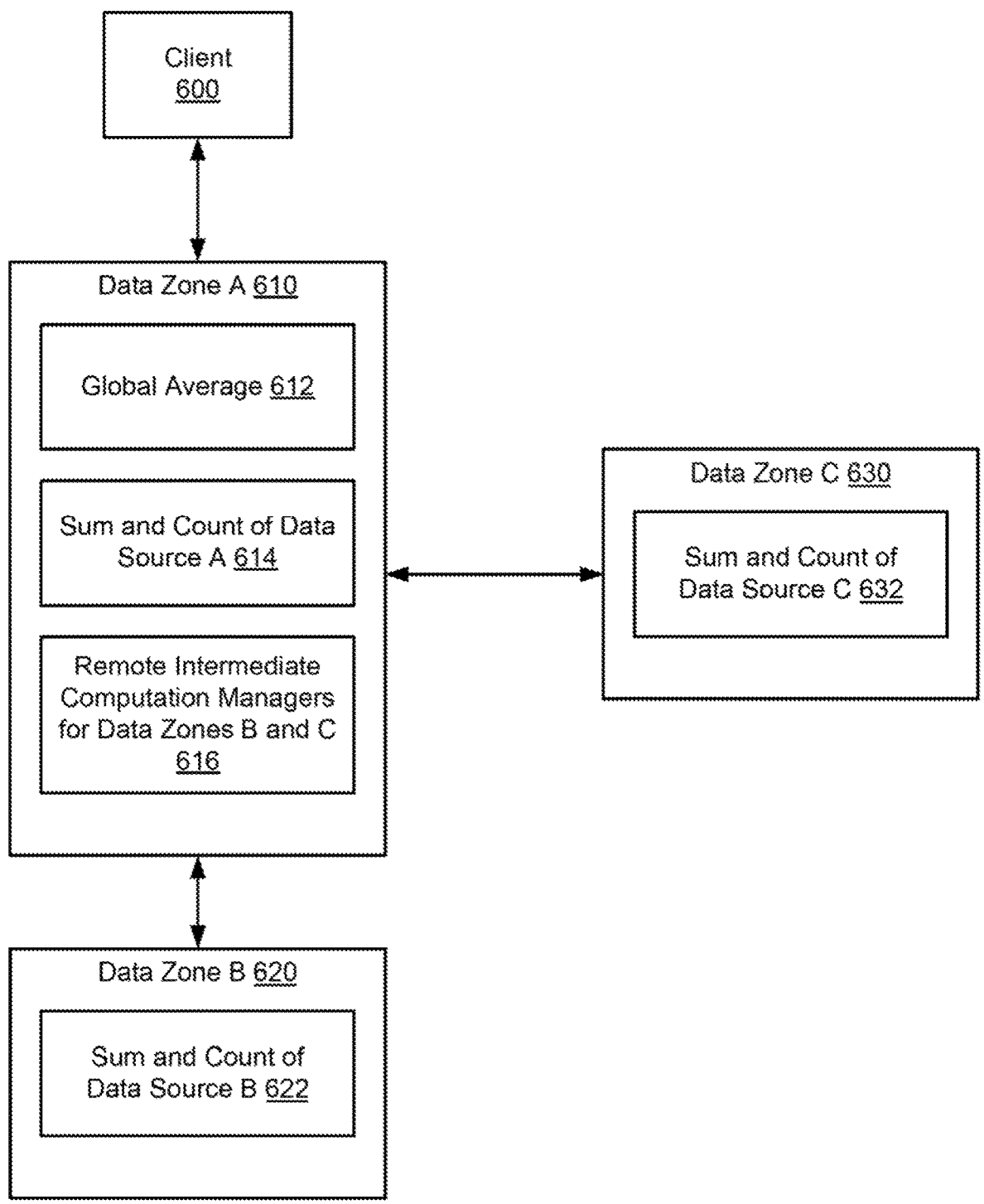
FIG. 6 shows a diagram of an example system.

To further clarify aspects of the invention, a non-limiting example is shown in FIG. 6. FIG. 6 shows a diagram of a system. Not all components of the system are shown in FIG. 6 for brevity.

Example

Consider a system, as illustrated in FIG. 6, in which a client (600) is operably connected to data zones A-C (610, 620, 630). Each data zone includes a sensor (not shown) that stores data as data sources in the respective data zones.

Consider a scenario where the client (600) sends a global computation request to data zone A (610) requesting an average of all of the sensor data.

In response to the request, the data zone A (610) instantiates a framework manager (not shown) associated with the request. The framework manager, in turn, instantiates a global average (612) of the sensor data in data zones A-C as a global computation. To facilitate the execution of the global computation, the framework manager instantiates a local intermediate calculation (614) to obtain a sum and count of the sensor data in data zone A (610). Additionally, the framework manager instantiates remote intermediate computation managers (616) for data zones B and C, respectively, because each of data zones B and C include sensor data.

In data zone B (620) a sum and count (622) of the sensor data computation is instantiated as an intermediate computation. Similarly, in data zone C (630), a sum and count (632) of the sensor data computation is instantiated as an additional intermediate computation.

To facilitate generating a global computation result, the remote intermediate computation managers for data zones B and C (616) obtain the intermediate results from data zones B and C, respectively. The aforementioned intermediate results obtained from data zones B and C are provided, along with the intermediate result generated in data zone A to the global computation, i.e., global average (612). The global computation then generates a global average, e.g., the average, by summing the sum from each intermediate computation, summing the count from each intermediate computation, and dividing the summed sum by the summed count.

Consider a scenario in which the sum and count of the intermediate computation (614) in data zone A (610) is 20 and 8, the sum and count of the intermediate computation (622) in data zone B (620) is 5 and 15, and the sum and count of the intermediate computation (632) in data zone C (630) is 27 and 3. The global average (612) would be calculated by summing the sums 20+5+27=52 and summing the counts 8+15+3=26. The summed sum of 52 is divided by the summed count of 27 resulting in a global average of 2.

In this example, a global average is calculated by sending a sum and count from each data zone to a single data zone in which the global average is calculated. Doing so dramatically reduces the bandwidth requirements and anonymizes the data by not sending the sensor data itself. Rather, intermediate computation results are sent to compute the desired global computation result.

The example ends.

Embodiments of the invention may improve the performance of computations in a network environment by distributing intermediate calculations to be performed by various data zones. A global computation may then be obtained using the intermediate computation results. The aforementioned distribution of computations across the network improves the performance of the computations by: (i) decreasing the communications bandwidth used to perform a global computation, (ii) decreasing disk input-output by reducing the quantity of data, e.g., copying of data sources, stored to perform a global computation, and (iii) spreading the computing load across a greater number of computing devices by performing intermediate computations across multiple data zones.

Still further, embodiments of the invention address the problem of computational resource cost scaling when performing global computations. As the quantity of data implicated by a global computation increases, it requires that any single data zone perform more computations, use more disk input-output, and utilize more bandwidth to move data to a centralized location and perform computations on the data at a centralized location, i.e., a single data zone. Embodiments of the invention reduce the likelihood of a single data zone becoming overwhelmed by attempting to compute a global computation.

While the above discussion highlighted features and/or uses of the invention, embodiments of the invention are not limited to similar uses and are not required to include similar features without departing from the invention. For example, some embodiments of the invention may have different, fewer, or more uses without departing from the invention.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any of the elements. A second data structure, also labeled as A to N, may also include any number of elements. The number of elements of the first data structure and the number of elements of the second data structure may be the same or different.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A computing device of a first data zone, comprising:
   a persistent storage comprising at least a first data source; and
   a processor programmed:
      to obtain a first global computation request;
      to instantiate a first global computation based at least in part on the first global computation request;
      to instantiate a first intermediate computation on first data stored in the first data source based at least in part on the instantiated first global computation;
      to instantiate at least a second intermediate computation on second data stored in a second data source in a second data zone based at least in part on the instantiated first global computation;

to obtain, from the instantiated first intermediate computation, a first intermediate computation result, the first intermediate computation result being based at least in part on the first data stored in the first data source;

to obtain, from the instantiated second intermediate computation, a second intermediate computation result without transferring the second data stored in the second data source from the second data zone to the first data zone, the second intermediate computation result being based at least in part on the second data stored in the second data source; and to generate a first global computation result specified by the first global computation request, the first global computation result being based at least in part on the first intermediate computation result and the second intermediate computation results;

wherein instantiating the first global computation based at least in part on the first global computation request comprises:

determining a type of computation result specified by the first global computation request;

matching the determined type of computation result to a template; and generating executable code for the first global computation based at least in part on a global computation prototype of the matched template.

2. The computing device of claim 1, wherein the global computation request specifies the first data source in the first data zone and the second data source in the second data zone.

3. The computing device of claim 1, wherein the matched template comprises:

the global computation prototype; and
an intermediate computation prototype.

4. The computing device of claim 3, wherein instantiating the second intermediate computation in the second data zone based at least in part on the instantiated first global computation comprises:

identifying the second data source in the second data zone based at least in part on an input of the instantiated first global computation; and generating executable code for the second intermediate computation based at least in part on the intermediate computation prototype of the matched template.

5. The computing device of claim 1, wherein instantiating the second intermediate computation in a second data zone based at least in part on the instantiated first global computation comprises:

instantiating a third intermediate computation on third data stored in at least a third data source in a third data zone based at least in part on the instantiated second intermediate computation in the second data zone.

6. The computing device of claim 1, wherein the first global computation request specifies:

a requesting entity;
at least one computation to be performed; and
grouping criteria for identifying a plurality of data sources, including at least the first data source and the second data source, on which the at least one computation is to be performed.

7. The computing device of claim 1, wherein instantiating the second intermediate computation comprises instantiating a second global computation on a computing device of the second data zone, and wherein the second global computation:

instantiates one or more additional intermediate computations on data stored in one or more additional data sources in one or more additional data zones; and generates a second global computation result based at least in part on one or more additional intermediate computation results, obtained from the one or more additional intermediate computations, without transferring the data stored in the one or more additional data sources from the one or more additional data zones to the second data zone.

8. The computing device of claim 7, wherein the second intermediate computation result is based at least in part on the second global computation result.

9. The computing device of claim 1, wherein the first data stored in the first data source comprises first sensor data collected from a first set of sensors, the second data stored in the second data source comprises second sensor data collected from a second set of sensors, the first intermediate computation result anonymizes the first sensor data collected from the first set of sensors, and the second intermediate computation result anonymizes the second sensor data collected from the second set of sensors.

10. The computing device of claim 1, wherein:

the first data in the first data source comprises dynamically changing first sensor data streamed from a first set of sensors to the first data zone;

the second data in the second data source comprises dynamically changing second sensor data streamed from a second set of sensors to the second data zone;

the first intermediate computation result is associated with a first intermediate computation result identifier, the first intermediate computation result identifier specifying a first time stamp identifying the dynamically changing first sensor data at a time of generation of the first intermediate computation result; and the second intermediate computation result is associated with a second intermediate computation result identifier, the second intermediate computation result identifier specifying a second time stamp identifying the dynamically changing second sensor data at a time of generation of the second intermediate computation result.

11. The computing device of claim 10, wherein the processor is further programmed to associate a first global computation result identifier associated with the first global computation result, the first global computation result identifier specifying a third time stamp identifying a time associated with generation of the first global computation result.

12. A method of operating a computing device of a first data zone, comprising:

obtaining, by the computing device, a first global computation request;

instantiating, by the computing device, a first global computation based at least in part on the first global computation request;

instantiating, by the computing device, a first intermediate computation on first data stored in the first data source based at least in part on the instantiated first global computation;

instantiating, by the computing device, at least a second intermediate computation on second data stored in a second data zone based at least in part on the instantiated first global computation;

obtaining, from the instantiated first intermediate computation, a first intermediate computation result, the first intermediate computation result being based at least in part on the first data stored in the first data source;

obtaining, from the instantiated second intermediate computation, a second intermediate computation result without transferring the second data stored in the second data zone to the first data zone, the second intermediate computation result being based at least in part on the second data stored in the second data source; and generating a first global computation result specified by the first global computation request, the first global computation result being based at least in part on the first intermediate computation result and the second intermediate computation result;

wherein instantiating the first global computation based at least in part on the first global computation request comprises:
  determining a type of computation result specified by the first global computation request;
  matching the determined type of computation result to a template; and
  generating executable code for the first global computation based at least in part on a global computation prototype of the matched template.

13. The method of claim 12, wherein
instantiating the second intermediate computation in the second data zone based at least in part on the instantiated first global computation comprises:
  identifying the second data source in the second data zone based at least in part on an input of the instantiated first global computation; and
  generating executable code for the second intermediate computation based at least in part on an intermediate computation prototype of the matched template.

14. The method of claim 12, wherein instantiating the second intermediate computation comprises instantiating a second global computation on a computing device of the second data zone, and wherein the second global computation:
  instantiates one or more additional intermediate computations on data stored in one or more additional data sources in one or more additional data zones; and
  generates a second global computation result based at least in part on one or more additional intermediate computation results, obtained from the one or more additional intermediate computations without transferring the data stored in the one or more additional data sources from the one or more additional data zones to the second data zone.

15. The method of claim 12, wherein the first data stored in the first data source comprises first sensor data collected from a first set of sensors, the second data stored in the second data source comprises second sensor data collected from a second set of sensors, the first intermediate computation result anonymizes the first sensor data collected from the first set of sensors, and the second intermediate computation result anonymizes the second sensor data collected from the second set of sensors.

16. A non-transitory computer readable medium comprising computer readable program code, which when executed by a computer processor enables the computer processor to perform a method for operating a computing device of a data zone, the method comprising:
  obtaining, by the computing device, a first global computation request;
  instantiating, by the computing device, a first global computation based at least in part on the first global computation request;
  instantiating, by the computing device, a first intermediate computation on first data stored in the first data source based at least in part on the instantiated first global computation;
  instantiating, by the computing device, at least a second intermediate computation on second data stored in a second data zone based at least in part on the instantiated first global computation;
  obtaining, from the instantiated first intermediate computation, a first intermediate computation result, the first intermediate computation result being based at least in part on the first data stored in the first data source;
  obtaining, from the instantiated second intermediate computation, a second intermediate computation result without transferring the second data stored in the second data zone to the first data zone, the second intermediate computation result being based at least in part on the second data stored in the second data source; and
  generating a first global computation result specified by the first global computation request, the first global computation result being based at least in part on the first intermediate computation result and the second intermediate computation result;

wherein instantiating the first global computation based at least in part on the first global computation request comprises:
  determining a type of computation result specified by the first global computation request;
  matching the determined type of computation result to a template; and
  generating executable code for the first global computation based at least in part on a global computation prototype of the matched template.

17. The non-transitory computer readable medium of claim 16, wherein
instantiating the second intermediate computation in the second data zone based at least in part on the instantiated first global computation comprises:
  identifying the second data source in the second data zone based at least in part on an input of the instantiated first global computation; and
  generating executable code for the second intermediate computation based at least in part on an intermediate computation prototype of the matched template.

18. The non-transitory computer readable medium of claim 16, wherein instantiating the second intermediate computation comprises instantiating a second global computation on a computing device of the second data zone, and wherein the second global computation:
  instantiates one or more additional intermediate computations on data stored in one or more additional data sources in one or more additional data zones; and
  generates a second global computation result based at least in part on one or more additional intermediate computation results, obtained from the one or more additional intermediate computations without transferring the data stored in the one or more additional data sources from the one or more additional data zones to the second data zone.

19. The non-transitory computer readable medium of claim 16, wherein the first data stored in the first data source comprises first sensor data collected from a first set of sensors, the second data stored in the second data source comprises second sensor data collected from a second set of sensors, the first intermediate computation result anonymizes the first sensor data collected from the first set of sensors, and the second intermediate computation result anonymizes the second sensor data collected from the second set of sensors.

20. The non-transitory computer readable medium of claim 16, wherein:
- the first data in the first data source comprises dynamically changing first sensor data streamed from a first set of sensors to the first data zone;
- the second data in the second data source comprises dynamically changing second sensor data streamed from a second set of sensors to the second data zone;
- the first intermediate computation result is associated with a first intermediate computation result identifier, the first intermediate computation result identifier specifying a first time stamp identifying the dynamically changing first sensor data at a time of generation of the first intermediate computation result; and
- the second intermediate computation result is associated with a second intermediate computation result identifier, the second intermediate computation result identifier specifying a second time stamp identifying the dynamically changing second sensor data at a time of generation of the second intermediate computation result.

* * * * *